US012696045B2

(12) United States Patent
Schmidt

(10) Patent No.: US 12,696,045 B2
(45) Date of Patent: Jul. 28, 2026

(54) VOICE ANALYSIS DRIVEN AUDIO PARAMETER MODIFICATIONS

(71) Applicant: Magic Leap, Inc., Plantation, FL (US)

(72) Inventor: Brian Lloyd Schmidt, Bellevue, WA (US)

(73) Assignee: MAGIC LEAP, INC., Plantation, FL (US)

( * ) Notice: Subject to any disclaimer, the term of this patent is extended or adjusted under 35 U.S.C. 154(b) by 157 days.

(21) Appl. No.: 18/701,410

(22) PCT Filed: Oct. 18, 2022

(86) PCT No.: PCT/US2022/078298

§ 371 (c)(1),
(2) Date: Apr. 15, 2024

(87) PCT Pub. No.: WO2023/069946

PCT Pub. Date: Apr. 27, 2023

(65) Prior Publication Data

US 2025/0240592 A1     Jul. 24, 2025

Related U.S. Application Data

(60) Provisional application No. 63/271,056, filed on Oct. 22, 2021.

(51) Int. Cl.
*H04S 7/00* (2006.01)
*G06F 3/01* (2006.01)

(52) U.S. Cl.
CPC .............. *H04S 7/304* (2013.01); *G06F 3/012* (2013.01); *G06F 3/017* (2013.01);
(Continued)

(58) Field of Classification Search
CPC ...... H04S 7/304; H04S 2420/01; G06F 3/012; G06F 3/017; H04R 2201/107; H04R 2499/15
See application file for complete search history.

(56) References Cited

U.S. PATENT DOCUMENTS

| | | | |
|---|---|---|---|
| 4,158,750 A | 6/1979 | Sakoe |
| 4,852,988 A | 8/1989 | Velez |

(Continued)

FOREIGN PATENT DOCUMENTS

| | | |
|---|---|---|
| CA | 2304900 C | 10/2000 |
| CA | 2316473 A1 | 1/2001 |

(Continued)

OTHER PUBLICATIONS

Supplementary European Search Report issued for Application No. 22884642.4 mailing date May 14, 2025.

(Continued)

*Primary Examiner* — Paul W Huber
(74) *Attorney, Agent, or Firm* — KLINTWORTH & ROZENBLAT LLP

(57) ABSTRACT

Embodiments of the present disclosure can provide systems and methods for presenting audio signals based on an analysis of a voice of a speaker in an augmented reality or mixed reality environment. Methods according to embodiments of this disclosure can include receiving audio data from a microphone of a first wearable head device, the first wearable head device in communication with a virtual environment, the audio data comprising speech data. In some examples, the methods can include identifying a voice parameter based on the audio data. In some examples, the methods can include determining an acoustic parameter based on the voice parameter. In some examples, the methods can include applying the acoustic parameter to the audio data to generate a spatialized audio signal. In some examples, the methods can include presenting the spatialized audio signal to a second wearable head device in communication with the virtual environment.

19 Claims, 22 Drawing Sheets

(52) U.S. Cl.
CPC .... *H04R 2201/107* (2013.01); *H04R 2499/15* (2013.01); *H04S 2420/01* (2013.01)

(56) References Cited

U.S. PATENT DOCUMENTS

| | | | |
|---|---|---|---|
| 5,627,899 A | 5/1997 | Craven et al. | |
| 6,433,760 B1 | 8/2002 | Vaissie | |
| 6,491,391 B1 | 12/2002 | Blum et al. | |
| 6,496,799 B1 | 12/2002 | Pickering | |
| 6,738,482 B1 | 5/2004 | Jaber | |
| 6,820,056 B1 | 11/2004 | Harif | |
| 6,847,336 B1 | 1/2005 | Lemelson | |
| 6,943,754 B2 | 9/2005 | Aughey | |
| 6,977,776 B2 | 12/2005 | Volkenandt et al. | |
| 7,346,654 B1* | 3/2008 | Weiss | H04N 7/15 |
| | | | 348/E7.083 |
| 7,347,551 B2 | 3/2008 | Fergason et al. | |
| 7,488,294 B2 | 2/2009 | Torch | |
| 7,587,319 B2 | 9/2009 | Catchpole | |
| 7,979,277 B2 | 7/2011 | Larri et al. | |
| 8,154,588 B2 | 4/2012 | Burns | |
| 8,235,529 B1 | 8/2012 | Raffle | |
| 8,611,015 B2 | 12/2013 | Wheeler | |
| 8,627,213 B1* | 1/2014 | Jouppi | H04M 3/568 |
| | | | 715/848 |
| 8,638,498 B2 | 1/2014 | Bohn et al. | |
| 8,696,113 B2 | 4/2014 | Lewis | |
| 8,929,589 B2 | 1/2015 | Publicover et al. | |
| 9,010,929 B2 | 4/2015 | Lewis | |
| 9,274,338 B2 | 3/2016 | Robbins et al. | |
| 9,292,973 B2 | 3/2016 | Bar-zeev et al. | |
| 9,294,860 B1 | 3/2016 | Carlson | |
| 9,323,325 B2 | 4/2016 | Perez et al. | |
| 9,715,875 B2 | 7/2017 | Piernot | |
| 9,720,505 B2 | 8/2017 | Gribetz et al. | |
| 10,013,053 B2 | 7/2018 | Cederlund et al. | |
| 10,025,379 B2 | 7/2018 | Drake et al. | |
| 10,062,377 B2 | 8/2018 | Larri et al. | |
| 10,134,425 B1 | 11/2018 | Johnson, Jr. | |
| 10,289,205 B1 | 5/2019 | Sumter | |
| 10,839,789 B2 | 11/2020 | Larri et al. | |
| 10,971,140 B2 | 4/2021 | Catchpole | |
| 11,151,997 B2 | 10/2021 | Sugiyama et al. | |
| 11,328,740 B2 | 5/2022 | Lee et al. | |
| 11,587,563 B2 | 2/2023 | Sheeder et al. | |
| 11,758,347 B1* | 9/2023 | Robinson | H04S 7/303 |
| | | | 381/303 |
| 11,790,935 B2 | 10/2023 | Lee et al. | |
| 11,812,194 B1* | 11/2023 | Vandyke | G06F 3/167 |
| 11,854,550 B2 | 12/2023 | Sheeder | |
| 11,854,566 B2 | 12/2023 | Leider | |
| 11,917,384 B2 | 2/2024 | Roach | |
| 12,094,489 B2 | 9/2024 | Lee | |
| 12,238,496 B2 | 2/2025 | Roach et al. | |
| 12,243,531 B2 | 3/2025 | Sheeder et al. | |
| 2001/0055985 A1 | 12/2001 | Matt et al. | |
| 2003/0030597 A1 | 2/2003 | Geist | |
| 2005/0033571 A1 | 2/2005 | Huang | |
| 2005/0069852 A1 | 3/2005 | Janakiraman et al. | |
| 2006/0023158 A1 | 2/2006 | Howell et al. | |
| 2006/0072767 A1 | 4/2006 | Zhang et al. | |
| 2006/0098827 A1 | 5/2006 | Paddock et al. | |
| 2006/0178876 A1 | 8/2006 | Sato et al. | |
| 2007/0225982 A1 | 9/2007 | Washio | |
| 2008/0124690 A1 | 5/2008 | Redlich | |
| 2008/0201138 A1 | 8/2008 | Visser et al. | |
| 2009/0180626 A1 | 7/2009 | Nakano | |
| 2009/0303984 A1* | 12/2009 | Clark | H04L 63/104 |
| | | | 370/352 |
| 2010/0245585 A1 | 9/2010 | Fisher et al. | |
| 2010/0323652 A1 | 12/2010 | Visser et al. | |
| 2011/0211056 A1 | 9/2011 | Publicover et al. | |
| 2011/0213664 A1 | 9/2011 | Osterhout | |
| 2011/0238407 A1 | 9/2011 | Kent | |
| 2011/0288860 A1 | 11/2011 | Schevciw et al. | |
| 2012/0021806 A1 | 1/2012 | Maltz | |
| 2012/0130713 A1 | 5/2012 | Shin et al. | |
| 2012/0209601 A1 | 8/2012 | Jing | |
| 2013/0077147 A1 | 3/2013 | Efimov | |
| 2013/0204607 A1 | 8/2013 | Baker, IV | |
| 2013/0226589 A1 | 8/2013 | Largey | |
| 2013/0236040 A1 | 9/2013 | Crawford | |
| 2013/0339028 A1 | 12/2013 | Rosner et al. | |
| 2014/0016793 A1* | 1/2014 | Gardner | H04M 3/56 |
| | | | 709/204 |
| 2014/0194702 A1 | 7/2014 | Tran | |
| 2014/0195918 A1 | 7/2014 | Friedlander | |
| 2014/0200887 A1 | 7/2014 | Nakadai et al. | |
| 2014/0222430 A1 | 8/2014 | Rao | |
| 2014/0270202 A1 | 9/2014 | Ivanov et al. | |
| 2014/0270244 A1 | 9/2014 | Fan | |
| 2014/0310595 A1 | 10/2014 | Acharya et al. | |
| 2014/0337023 A1 | 11/2014 | Mcculloch et al. | |
| 2014/0379336 A1 | 12/2014 | Bhatnagar | |
| 2015/0006181 A1 | 1/2015 | Fan et al. | |
| 2015/0168731 A1 | 6/2015 | Robbins | |
| 2015/0310857 A1 | 10/2015 | Habets et al. | |
| 2015/0348572 A1 | 12/2015 | Thornburg et al. | |
| 2016/0019910 A1 | 1/2016 | Faubel et al. | |
| 2016/0066113 A1 | 3/2016 | Elkhatib et al. | |
| 2016/0112817 A1 | 4/2016 | Fan et al. | |
| 2016/0142830 A1 | 5/2016 | Hu | |
| 2016/0165340 A1 | 6/2016 | Benattar | |
| 2016/0180837 A1 | 6/2016 | Gustavsson | |
| 2016/0216130 A1 | 7/2016 | Abramson et al. | |
| 2016/0217781 A1 | 7/2016 | Zhong et al. | |
| 2016/0284350 A1 | 9/2016 | Yun et al. | |
| 2016/0358598 A1 | 12/2016 | Williams et al. | |
| 2016/0379629 A1 | 12/2016 | Hofer et al. | |
| 2016/0379632 A1 | 12/2016 | Hoffmeister et al. | |
| 2016/0379638 A1 | 12/2016 | Basye et al. | |
| 2017/0078819 A1 | 3/2017 | Habets | |
| 2017/0091169 A1 | 3/2017 | Bellegarda | |
| 2017/0092276 A1 | 3/2017 | Sun et al. | |
| 2017/0110116 A1 | 4/2017 | Tadpatrikar et al. | |
| 2017/0148429 A1 | 5/2017 | Hayakawa | |
| 2017/0270919 A1 | 9/2017 | Parthasarathi et al. | |
| 2017/0280239 A1 | 9/2017 | Sekiya | |
| 2017/0316780 A1 | 11/2017 | Lovitt | |
| 2017/0330555 A1 | 11/2017 | Kawano | |
| 2017/0332187 A1 | 11/2017 | Lin | |
| 2018/0011534 A1 | 1/2018 | Poulos et al. | |
| 2018/0053284 A1 | 2/2018 | Rodriguez et al. | |
| 2018/0077095 A1 | 3/2018 | Deyle et al. | |
| 2018/0129469 A1 | 5/2018 | Vennström et al. | |
| 2018/0227665 A1 | 8/2018 | Elko et al. | |
| 2018/0270571 A1* | 9/2018 | Di Censo | G10K 11/175 |
| 2018/0316939 A1 | 11/2018 | Todd | |
| 2018/0336902 A1 | 11/2018 | Cartwright et al. | |
| 2018/0349946 A1 | 12/2018 | Nguyen | |
| 2018/0358021 A1 | 12/2018 | Mistica et al. | |
| 2018/0366114 A1 | 12/2018 | Anbazhagan et al. | |
| 2019/0129944 A1 | 5/2019 | Kawano | |
| 2019/0362704 A1 | 11/2019 | Nicolis et al. | |
| 2019/0362741 A1 | 11/2019 | Li et al. | |
| 2019/0373362 A1 | 12/2019 | Ansai et al. | |
| 2019/0392641 A1 | 12/2019 | Taylor | |
| 2020/0027455 A1 | 1/2020 | Sugiyama et al. | |
| 2020/0064921 A1 | 2/2020 | Kang et al. | |
| 2020/0142665 A1 | 5/2020 | Dantrey et al. | |
| 2020/0194028 A1 | 6/2020 | Lipman | |
| 2020/0213729 A1 | 7/2020 | Soto | |
| 2020/0279552 A1 | 9/2020 | Piersol et al. | |
| 2020/0286465 A1 | 9/2020 | Wang et al. | |
| 2020/0296521 A1 | 9/2020 | Wexler et al. | |
| 2020/0335128 A1 | 10/2020 | Sheeder et al. | |
| 2020/0359158 A1* | 11/2020 | Brimijoin, II | G06F 3/16 |
| 2021/0056966 A1 | 2/2021 | Bilac et al. | |
| 2021/0125609 A1 | 4/2021 | Dusan et al. | |
| 2021/0192413 A1 | 6/2021 | Shirazipour | |
| 2021/0327140 A1* | 10/2021 | Rothkopf | G06T 13/205 |
| 2023/0386461 A1 | 11/2023 | Leider | |
| 2023/0410835 A1 | 12/2023 | Lee | |
| 2024/0087565 A1 | 3/2024 | Sheeder | |

(56) References Cited

U.S. PATENT DOCUMENTS

| | | | |
|---|---|---|---|
| 2024/0087587 A1 | 3/2024 | Leider | |
| 2024/0163612 A1 | 5/2024 | Roach | |
| 2024/0420718 A1 | 12/2024 | Audfray | |
| 2025/0006219 A1 | 1/2025 | Lee | |
| 2025/0220347 A1* | 7/2025 | Brimijoin | G06F 3/017 |

FOREIGN PATENT DOCUMENTS

| | | | |
|---|---|---|---|
| CA | 2362895 A1 | 12/2002 |
| CA | 2388766 A1 | 12/2003 |
| CN | 105529033 A | 4/2016 |
| EP | 2950307 A1 | 12/2015 |
| EP | 3211918 A1 | 8/2017 |
| EP | 3716038 A1 | 9/2020 |
| JP | S52144205 A | 12/1977 |
| JP | 06075588 A | 3/1994 |
| JP | 2000148184 A | 5/2000 |
| JP | 2000261534 A | 9/2000 |
| JP | 2002135173 A | 5/2002 |
| JP | 2003264883 A | 9/2003 |
| JP | 2005196134 A | 7/2005 |
| JP | 2008242067 A | 10/2008 |
| JP | 2010273305 A | 12/2010 |
| JP | 2013183358 A | 9/2013 |
| JP | 2014137405 A | 7/2014 |
| JP | 2014178339 A | 9/2014 |
| JP | 2016004270 A | 1/2016 |
| JP | 2017211596 A | 11/2017 |
| JP | 2018523156 A | 8/2018 |
| JP | 2018179954 A | 11/2018 |
| WO | 2014113891 A1 | 7/2014 |
| WO | 2014159581 A1 | 10/2014 |
| WO | 2015169618 A1 | 11/2015 |
| WO | 2016063587 A1 | 4/2016 |
| WO | 2016151956 A1 | 9/2016 |
| WO | 2016153712 A1 | 9/2016 |
| WO | 2017003903 A1 | 1/2017 |
| WO | 2017017591 A1 | 2/2017 |
| WO | 2017191711 A1 | 11/2017 |
| WO | 2018163648 A1 | 9/2018 |
| WO | 2019224292 A1 | 11/2019 |
| WO | 2020180719 A1 | 9/2020 |
| WO | 2020214844 A1 | 10/2020 |
| WO | 2022072752 A1 | 4/2022 |
| WO | 2023064875 A1 | 4/2023 |

OTHER PUBLICATIONS

Chinese Notice of Allowance dated Feb. 18, 2025, for CN Application No. 202080044362.4, with English translation, 7 pages.
Chinese Notice of Allowance dated Nov. 7, 2024, for CN Application No. 201980050714.4, with English translation, 6 pages.
European Search Report dated Jan. 20, 2025, for EP Application No. 24221982.2 nine pages.
Hatashima, Takashi et al. "A study on a subband acoustic echo chaceller using a single microphone, Institute of Electronics, Information and Communication Engineers technical research report", Feb. 1995, vol. 94, No. 522, p. 1-8 (document showing a well-known technique). Note: An English language abstract can be found on the cover page of this reference.
Japanese Office Action mailed Nov. 7, 2024, for JP Application No. 2023-142856, with English translation, 12 pages.
Kaushik, Mayank, et al. "Three Dimensional Microphone and Source Position Estimation Using TDOA and TOF Measurements. "2011 IEEE International Conference on Signal Processing, Communications and Computing (ICSPCC). IEEE, 2011. (Year: 2011).
Non-Final Office Action mailed Jan. 24, 2025, for U.S. Appl. No. 18/510,376, filed Nov. 15, 2023, seventeen pages.
Non-Final Office Action mailed Mar. 4, 2025, for U.S. Appl. No. 18/029,355, filed Mar. 29, 2023, ten pages.
Notice of Allowance mailed Dec. 11, 2024, for U.S. Appl. No. 18/418,131 filed Jan. 19, 2024, seven pages.

Notice of Allowance mailed Dec. 19, 2024, for U.S. Appl. No. 18/506,866, filed Nov. 10, 2023, five pages.
Backstrom, T. (Oct. 2015). "Voice Activity Detection Speech Processing," Aalto University, vol. 58, No. 10; Publication [online], retrieved Apr. 19, 2020, retrieved from the Internet: URL: https://mycourses.aalto.fi/pluginfile.php/146209/mod_resource/content/1/slides_07_vad.pdf, ; pp. 1-36.
Bilac, M. et al. (Nov. 15, 2017). Gaze and Filled Pause Detection for Smooth Human-Robot Conversations. www.angelicalim.com, retrieved on Jun. 17, 2020, Retrieved from the internet URL: http://www.angelicalim.com/papers/humanoids2017_paper.pdf entire document, 8 pages. (20.40).
Chinese Office Action dated Dec. 21, 2023, for CN Application No. 201980050714.4, with English translation, eighteen pages.
European Office Action dated Dec. 12, 2023, for EP Application No. 20766540.7, four pages.
European Office Action dated Jun. 1, 2023, for EP Application No. 19822754.8, six pages.
European Search Report dated Nov. 12, 2021, for EP Application No. 19822754.8, ten pages.
European Search Report dated Nov. 21, 2022, for EP Application No. 20791183.5 nine pages.
European Search Report dated Oct. 6, 2022, for EP Application No. 20766540.7 nine pages.
Final Office Action mailed Apr. 10, 2023, for U.S. Appl. No. 16/850,965, filed Apr. 16, 2020, sixteen pages.
Final Office Action mailed Apr. 15, 2022, for U.S. Appl. No. 16/850,965, filed Apr. 16, 2020, fourteen pages.
Final Office Action mailed Aug. 4, 2023, for U.S. Appl. No. 17/254,832, filed Dec. 21, 2020, seventeen pages.
Final Office Action mailed Aug. 5, 2022, for U.S. Appl. No. 16/805,337, filed Feb. 28, 2020, eighteen pages.
Final Office Action mailed Jan. 11, 2023, for U.S. Appl. No. 17/214,446, filed Mar. 26, 2021, sixteen pages.
Final Office Action mailed Jan. 23, 2024, for U.S. Appl. No. 16/850,965, filed Apr. 16, 2020, fifteen pages.
Final Office Action mailed Oct. 6, 2021, for U.S. Appl. No. 16/805,337, filed Feb. 28, 2020, fourteen pages.
Final Office Action mailed Sep. 7, 2023, for U.S. Appl. No. 17/214,446, filed Mar. 26, 2021, nineteen pages.
Harma, A. et al. (Jun. 2004). "Augmented Reality Audio for Mobile and Wearable Appliances," J. Audio Eng. Soc., vol. 52, No. 6, retrieved on Aug. 20, 2019, Retrieved from the Internet: URL:https://pdfs.semanticscholar.org/ae54/82c6a8d4add3e9707d780dfb5ce03d8e0120.pdf , 22 pages.
International Preliminary Report and Patentability mailed Dec. 22, 2020, for PCT Application No. PCT/US2019/038546, 13 pages.
International Preliminary Report and Written Opinion mailed Apr. 13, 2023, for PCT Application No. PCT/US2021/53046, filed Sep. 30, 2021, nine pages.
International Preliminary Report and Written Opinion mailed Apr. 25, 2024, for PCT Application No. PCT/US2022/078063, seven pages.
International Preliminary Report and Written Opinion mailed Oct. 28, 2021, for PCT Application No. PCT/US2020/028570, filed Apr. 16, 2020, 17 pages.
International Preliminary Report and Written Opinion mailed Sep. 16, 2021, for PCT Application No. PCT/US20/20469, filed Feb. 28, 2020, nine pages.
International Preliminary Report on Patentability and Written Opinion mailed Apr. 25, 2024, for PCT Application No. PCT/US2022/078073, seven pages.
International Preliminary Report on Patentability and Written Opinion mailed May 2, 2024, for PCT Application No. PCT/US2022/078298, twelve pages.
International Search Report and Written Opinion mailed Jan. 24, 2022, for PCT Application No. PCT/US2021/53046, filed Sep. 30, 2021, 15 pages.
International Search Report and Written Opinion mailed Jan. 17, 2023, for PCT Application No. PCT/US2022/078073, thirteen pages.
International Search Report and Written Opinion mailed Jan. 25, 2023, for PCT Application No. PCT/US2022/078063, nineteen pages.

(56)        References Cited

OTHER PUBLICATIONS

International Search Report and Written Opinion mailed Jul. 2, 2020, for PCT Application No. PCT/US2020/028570, filed Apr. 16, 2020, nineteen pages.

International Search Report and Written Opinion mailed May 18, 2020, for PCT Application No. PCT/US20/20469, filed Feb. 28, 2020, twenty pages.

International Search Report and Written Opinion mailed Sep. 17, 2019, for PCT Application No. PCT/US2019/038546, sixteen pages.

Jacob, R. "Eye Tracking in Advanced Interface Design", Virtual Environments and Advanced Interface Design, Oxford University Press, Inc. (Jun. 1995).

Japanese Notice of Allowance mailed Dec. 15, 2023, for JP Application No. 2020571488, with English translation, eight pages.

Japanese Office Action dated Jun. 2, 2023, for JP Application No. 2020 571488, with English translation, 9 pages.

Japanese Office Action mailed Jan. 30, 2024, for JP Application No. 2021-551538, with English translation, sixteen pages.

Japanese Office Action mailed May 2, 2024, for JP Application No. 2021-562002, with English translation, sixteen pages.

Kitayama, K. et al. (Sep. 30, 2003). "Speech Starter: Noise-Robust Endpoint Detection by Using Filled Pauses." Eurospeech 2003, retrieved on Jun. 17, 2020, retrieved from the internet URL: http://clteseerx.ist.psu.edu/viewdoc/download?doi=10 .1.1.141.1472 &rep=rep1&type=pdf entire document, pp. 1237-1240.

Liu, Baiyang, et al.: (Sep. 6, 2015). "Accurate Endpointing with Expected Pause Duration," Interspeech 2015, pp. 2912-2916, retrieved from: a href="https://scholar.google.com/scholar?q=BAIYANG"target= "_blank"https://scholar.google.com/scholar?q=BAIYANG/a,+Liu+ et+al.:+(September+6,+2015).+"Accurate+endpointing+with+expec ted+pause+duration,&hl=en&as_sdt=0&as_vis=1&oi=scholart.

Non-Final Office Action mailed Apr. 12, 2023, for U.S. Appl. No. 17/214,446, filed Mar. 26, 2021, seventeen pages.

Non-Final Office Action mailed Apr. 13, 2023, for U.S. Appl. No. 17/714,708, filed Apr. 6, 2022, sixteen pages.

Non-Final Office Action mailed Apr. 27, 2023, for U.S. Appl. No. 17/254,832, filed Dec. 21, 2020, fourteen pages.

Non-Final Office Action mailed Aug. 10, 2022, for U.S. Appl. No. 17/214,446, filed Mar. 26, 2021, fifteen pages.

Non-Final Office Action mailed Jun. 23, 2023, for U.S. Appl. No. 18/148,221, filed Dec. 29, 2022, thirteen pages.

Non-Final Office Action mailed Jun. 24, 2021, for U.S. Appl. No. 16/805,337, filed Feb. 28, 2020, fourteen pages.

Non-Final Office Action mailed Mar. 17, 2022, for U.S. Appl. No. 16/805,337, filed Feb. 28, 2020, sixteen pages.

Non-Final Office Action mailed Mar. 27, 2024, for U.S. Appl. No. 16/850,965, filed Apr. 16, 2020, sixteen pages.

Non-Final Office Action mailed Nov. 17, 2021, for U.S. Appl. No. 16/987,267, filed Aug. 6, 2020, 21 pages.

Non-Final Office Action mailed Oct. 4, 2021, for U.S. Appl. No. 16/850,965, filed Apr. 16, 2020, twelve pages.

Non-Final Office Action mailed Sep. 15, 2023, for U.S. Appl. No. 16/850,965, filed Apr. 16, 2020, fourteen pages.

Non-Final Office Action mailed Sep. 29, 2022, for U.S. Appl. No. 16/850,965, filed Apr. 16, 2020, fifteen pages.

Notice of Allowance mailed Dec. 15, 2023, for U.S. Appl. No. 17/214,446, filed Mar. 26, 2021, seven pages.

Notice of Allowance mailed Jul. 31, 2023, for U.S. Appl. No. 17/714,708, filed Apr. 6, 2022, eight pages.

Notice of Allowance mailed Jun. 5, 2024, for U.S. Appl. No. 18/459,342, filed Aug. 31, 2023, eight pages.

Notice of Allowance mailed Mar. 3, 2022, for U.S. Appl. No. 16/987,267, filed Aug. 6, 2020, nine pages.

Notice of Allowance mailed Nov. 30, 2022, for U.S. Appl. No. 16/805,337, filed Feb. 28, 2020, six pages.

Notice of Allowance mailed Oct. 12, 2023, for U.S. Appl. No. 18/148,221, filed Dec. 29, 2022, five pages.

Notice of Allowance mailed Oct. 17, 2023, for U.S. Appl. No. 17/254,832, filed Dec. 21, 2020, sixteen pages.

Rolland, J. et al., "High-resolution inset head-mounted display", Optical Society of America, vol. 37, No. 19, Applied Optics, (Jul. 1, 1998).

Shannon, Matt et al. (Aug. 20-24, 2017). "Improved End-of-Query Detection for Streaming Speech Recognition", Interspeech 2017, Stockholm, Sweden, pp. 1909-1913.

Tanriverdi, V. et al. (Apr. 2000). "Interacting With Eye Movements in Virtual Environments," Department of Electrical Engineering and Computer Science, Tufts University, Medford, MA 02155, USA, Proceedings of the SIGCHI conference on Human Factors in Computing Systems, eight pages.

Tonges, R. (Dec. 2015). "An augmented Acoustics Demonstrator with Realtime stereo up-mixing and Binaural Auralization," Technische University Berlin, Audio Communication Group, retrieved on Aug. 22, 2019, Retrieved from the Internet: URL: https://www2.ak.tu-berlin.de/~akgroup/ak_pub/abschlussarbeiten/2015/ToengesRaffael_MasA.pdf 100 pages.

Yoshida, A. et al., "Design and Applications of a High Resolution Insert Head Mounted Display", (Jun. 1994).

Japanese Final Office Action mailed May 31, 2024, for JP Application No. 2021-551538, with English translation, eighteen pages.

European Notice of Allowance dated Jul. 15, 2024, for EP Application No. 20791183.5 nine pages.

Final Office Action mailed Jul. 17, 2024, for U.S. Appl. No. 16/850,965, filed Apr. 16, 2020, seventeen pages.

Japanese Notice of Allowance mailed Aug. 21, 2024, for JP Application No. 2021-562002, with English translation, 6 pages.

Japanese Notice of Allowance mailed Oct. 28, 2024, for JP Application No. 2021-551538 with English translation, 6 pages.

Non-Final Office Action mailed Aug. 26, 2024, for U.S. Appl. No. 18/418,131 filed Jan. 19, 2024, ten pages.

Non-Final Office Action mailed Aug. 26, 2024, for U.S. Appl. No. 18/506,866 filed Nov. 10, 2023, twelve pages.

Non-Final Office Action mailed Nov. 6, 2024, for U.S. Appl. No. 16/850,965, filed Apr. 16, 2020, twenty pages.

Chinese Office Action dated Feb. 12, 2025, for CN Application No. 202080031993.2, with English translation, 18 pages.

Japanese Office Action mailed Apr. 16, 2025, for JP Application No. 2023-142856, with English translation, 6 pages.

Notice of Allowance (corrected) mailed May 7, 2025, for U.S. Appl. No. 16/850,965, filed Apr. 16, 2020, seven pages.

Notice of Allowance mailed Apr. 2, 2025, for U.S. Appl. No. 16/850,965, filed Apr. 16, 2020, ten pages.

Notice of Allowance mailed Apr. 25, 2025, for U.S. Appl. No. 18/510,376, filed Nov. 15, 2023, eight pages.

* cited by examiner

1100A

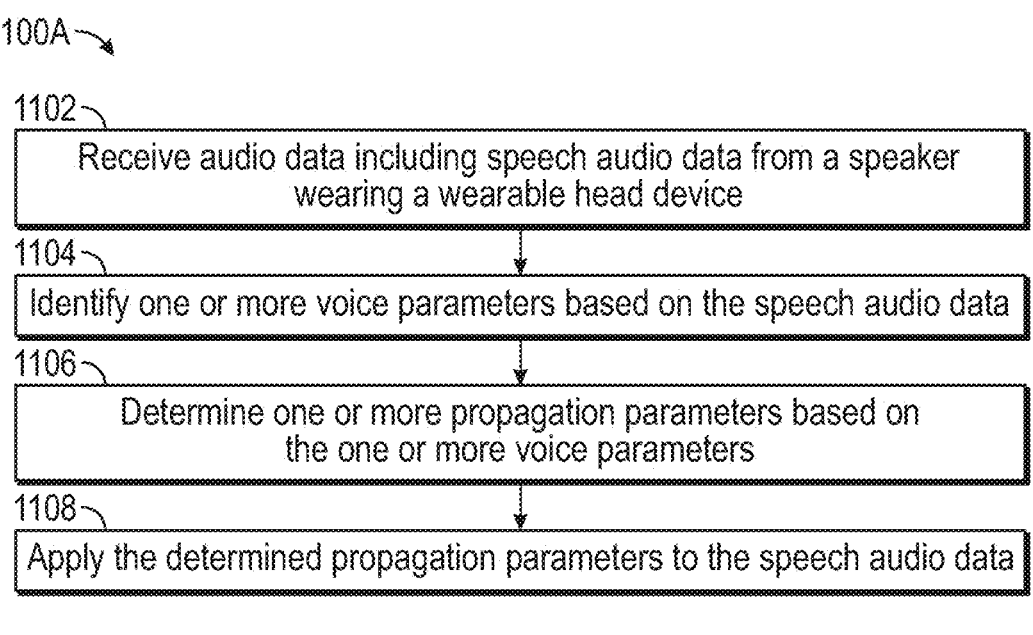

1102
Receive audio data including speech audio data from a speaker wearing a wearable head device 1104
Identify one or more voice parameters based on the speech audio data 1106
Determine one or more propagation parameters based on the one or more voice parameters 1108
Apply the determined propagation parameters to the speech audio data

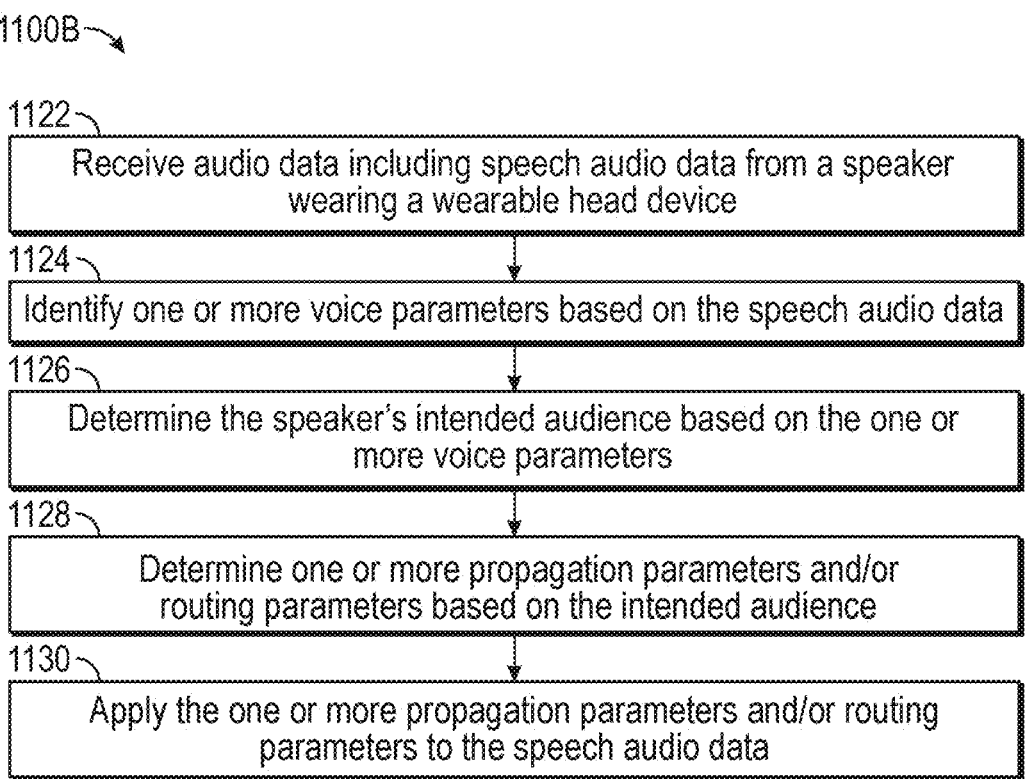

1122
Receive audio data including speech audio data from a speaker wearing a wearable head device 1124
Identify one or more voice parameters based on the speech audio data 1126
Determine the speaker's intended audience based on the one or more voice parameters 1128
Determine one or more propagation parameters and/or routing parameters based on the intended audience 1130
Apply the one or more propagation parameters and/or routing parameters to the speech audio data

Figures 11C, 11D:
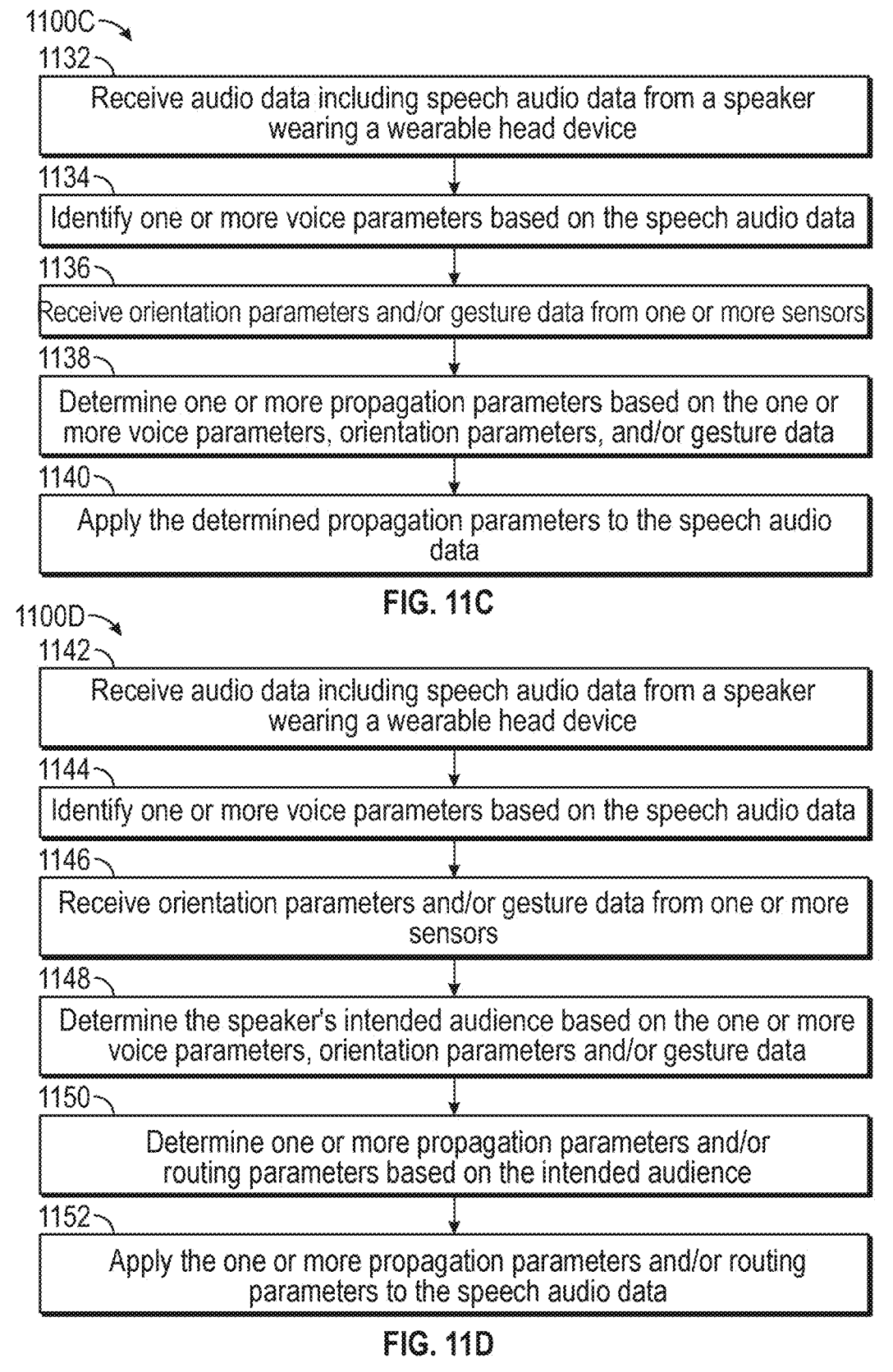

Receive audio data including speech audio data from a speaker wearing a wearable head device

1134

Identify one or more voice parameters based on the speech audio data

1136

Receive orientation parameters and/or gesture data from one or more sensors

1138

Determine one or more propagation parameters based on the one or more voice parameters, orientation parameters, and/or gesture data

1140

Apply the determined propagation parameters to the speech audio data

Receive audio data including speech audio data from a speaker wearing a wearable head device

1144

Identify one or more voice parameters based on the speech audio data

1146

Receive orientation parameters and/or gesture data from one or more sensors

1148

Determine the speaker's intended audience based on the one or more voice parameters, orientation parameters and/or gesture data

1150

Determine one or more propagation parameters and/or routing parameters based on the intended audience

1152

Apply the one or more propagation parameters and/or routing parameters to the speech audio data

VOICE ANALYSIS DRIVEN AUDIO PARAMETER MODIFICATIONS

CROSS REFERENCE TO RELATED APPLICATIONS

This application is a U.S. national stage application under 35 U.S.C. § 371 of International Application No. PCT/US2022/078298, filed internationally on Oct. 18, 2022, which claims priority to U.S. Provisional Application No. 63/271,056, filed on Oct. 22, 2021, the contents of which are incorporated by reference herein in their entirety.

This application claims priority to U.S. Provisional Application No. 63/271,056, filed on Oct. 22, 2021, the contents of which are incorporated by reference herein in their entirety.

FIELD

This disclosure relates in general to systems for generating and presenting audio signals, and in particular to generating and presenting audio signals based on an analysis of a voice of a speaker in an augmented reality or mixed reality environment.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. This disclosure contemplates a distinction between VR, AR, and MR systems (although some systems may be categorized as VR in one aspect (e.g., a visual aspect), and simultaneously categorized as AR or MR in another aspect (e.g., an audio aspect)). As used herein, VR systems present a virtual environment that replaces a user's real environment in at least one aspect; for example, a VR system could present the user with a view of the virtual environment while simultaneously obscuring his or her view of the real environment, such as with a light-blocking head-mounted display. Similarly, a VR system could present the user with audio corresponding to the virtual environment, while simultaneously blocking (attenuating) audio from the real environment.

VR systems may experience various drawbacks that result from replacing a user's real environment with a virtual environment. One drawback is a feeling of motion sickness that can arise when a user's field of view in a virtual environment no longer corresponds to the state of his or her inner ear, which detects one's balance and orientation in the real environment (not a virtual environment). Similarly, users may experience disorientation in VR environments where their own bodies and limbs (views of which users rely on to feel "grounded" in the real environment) are not directly visible. Another drawback is the computational burden (e.g., storage, processing power) placed on VR systems, which must present a full 3D virtual environment, particularly in real-time applications that seek to immerse the user in the virtual environment. Similarly, such environments may need to reach a very high standard of realism to be considered immersive, as users tend to be sensitive to even minor imperfections in virtual environments—any of which can destroy a user's sense of immersion in the virtual environment. Further, another drawback of VR systems is that such applications of systems cannot take advantage of the wide range of sensory data in the real environment, such as the various sights and sounds that one experiences in the real world. A related drawback is that VR systems may struggle to create shared environments in which multiple users can interact, as users that share a physical space in the real environment may not be able to directly see or interact with each other in a virtual environment.

As used herein, AR systems present a virtual environment that overlaps or overlays the real environment in at least one aspect. For example, an AR system could present the user with a view of a virtual environment overlaid on the user's view of the real environment, such as with a transmissive head-mounted display that presents a displayed image while allowing light to pass through the display into the user's eye. Similarly, an AR system could present the user with audio corresponding to the virtual environment, while simultaneously mixing in audio from the real environment. Similarly, as used herein, MR systems present a virtual environment that overlaps or overlays the real environment in at least one aspect, as do AR systems, and may additionally allow that a virtual environment in an MR system may interact with the real environment in at least one aspect. For example, a virtual character in a virtual environment may toggle a light switch in the real environment, causing a corresponding light bulb in the real environment to turn on or off. As another example, the virtual character may react (such as with a facial expression) to audio signals in the real environment. By maintaining presentation of the real environment, AR and MR systems may avoid some of the aforementioned drawbacks of VR systems; for instance, motion sickness in users is reduced because visual cues from the real environment (including users' own bodies) can remain visible, and such systems need not present a user with a fully realized 3D environment in order to be immersive. Further, AR and MR systems can take advantage of real world sensory input (e.g., views and sounds of scenery, objects, and other users) to create new applications that augment that input.

Facilitating natural conversation in a virtual reality or mixed reality environment among multiple participants can present several challenges. For example, in a real world environment a speaker can moderate their voice, e.g., raise their volume, whisper, modulate inflections, when talking to one or more people in order to reach an intended audience. For instance, a speaker can whisper to ensure that only their neighbor can hear them or raise their voice to get the attention of an entire room. Current XR systems where two or more participants interact can rely on distance-based attenuation models to determine whether a participant can hear a speaker. For example, if one or more listeners are located within a predetermined distance or radius of the speaker, the one or more listeners can hear the speaker.

Alternatively, if the one or more listeners are located beyond the predetermined radius, the one or more listeners may not be able to hear the speaker. Based on the current distance-based attenuation models, a speaker who attempts to whisper to one of their neighbors may be heard by any of the listeners within the predetermined radius of the speaker. Similarly, if the speaker raises their voice to speak to an entire room, individuals outside the pre-determined distance cannot hear the speaker. Thus, there exists a need for a system to provide a conversation environment that mimics a real world environment, where characteristics associated with a speaker's voice can impact who can hear the speaker.

BRIEF SUMMARY

Embodiments of the present disclosure can provide systems and methods for presenting audio signals based on an analysis of a voice of a speaker in an augmented reality or mixed reality environment. Methods according to embodiments of this disclosure can include receiving audio data from a microphone of a first wearable head device, the first wearable head device in communication with a virtual environment, the audio data comprising speech data. In some examples, the methods can further include identifying a voice parameter based on the audio data. In some examples, the methods can further include determining an acoustic parameter based on the voice parameter. In some examples, the methods can further include applying the acoustic parameter to the audio data to generate a spatialized audio signal. In some examples, the methods can further include presenting the spatialized audio signal to a second wearable head device in communication with the virtual environment.

Methods according to embodiments of this disclosure can include receiving, at a second wearable head device, spatialized audio data generated via a first wearable head device, the first wearable head device in communication with a virtual environment and the second wearable head device in communication with the virtual environment. In some examples, generating the spatialized audio data via the first wearable head device can include: receiving, at the first wearable head device, audio data from a microphone of the first wearable head device, the audio data comprising speech data, identifying a voice parameter based on the audio data, determining an acoustic parameter based on the voice parameter, and applying the acoustic parameter to the audio data to generate a spatialized audio signal.

Systems according to embodiments of this disclosure can include, at least, one or more processors, a memory, and one or more programs. In some examples, the one or more programs can be stored in the memory and be configured to be executed by the one or more processors. In some examples, the one or more programs include instructions for: receiving audio data from a microphone of a first wearable head device, the first wearable head device in communication with a virtual environment, the audio data comprising speech data, identifying a voice parameter based on the audio data, determining an acoustic parameter based on the voice parameter, applying the acoustic parameter to the audio data to generate a spatialized audio signal, and presenting the spatialized audio signal to a second wearable head device in communication with the virtual environment.

Systems according to embodiments of this disclosure can include, at least, one or more processors, a memory, and one or more programs. In some examples, the one or more programs can be stored in the memory and be configured to be executed by the one or more processors. In some examples, the one or more programs include instructions for receiving, at a second wearable head device, spatialized audio data generated via a first wearable head device, the first wearable head device in communication with a virtual environment and the second wearable head device in communication with the virtual environment. In some examples, generating the spatialized audio data via the first wearable head device can include: receiving, at the first wearable head device, audio data from a microphone of the first wearable head device, the audio data comprising speech data, identifying a voice parameter based on the audio data, determining an acoustic parameter based on the voice parameter, and applying the acoustic parameter to the audio data to generate a spatialized audio signal.

BRIEF DESCRIPTION OF THE DRAWINGS

FIGS. 11A-11E illustrate exemplary flow charts of a process for modifying acoustic parameters of a speaker, according to one or more embodiments of the disclosure.

FIG. 15 illustrates an exemplary virtual reality environment, according to one or more embodiments of the disclosure.

FIG. 16 illustrates an exemplary virtual reality environment, according to one or more embodiments of the disclosure.

DETAILED DESCRIPTION

Figure 1A:
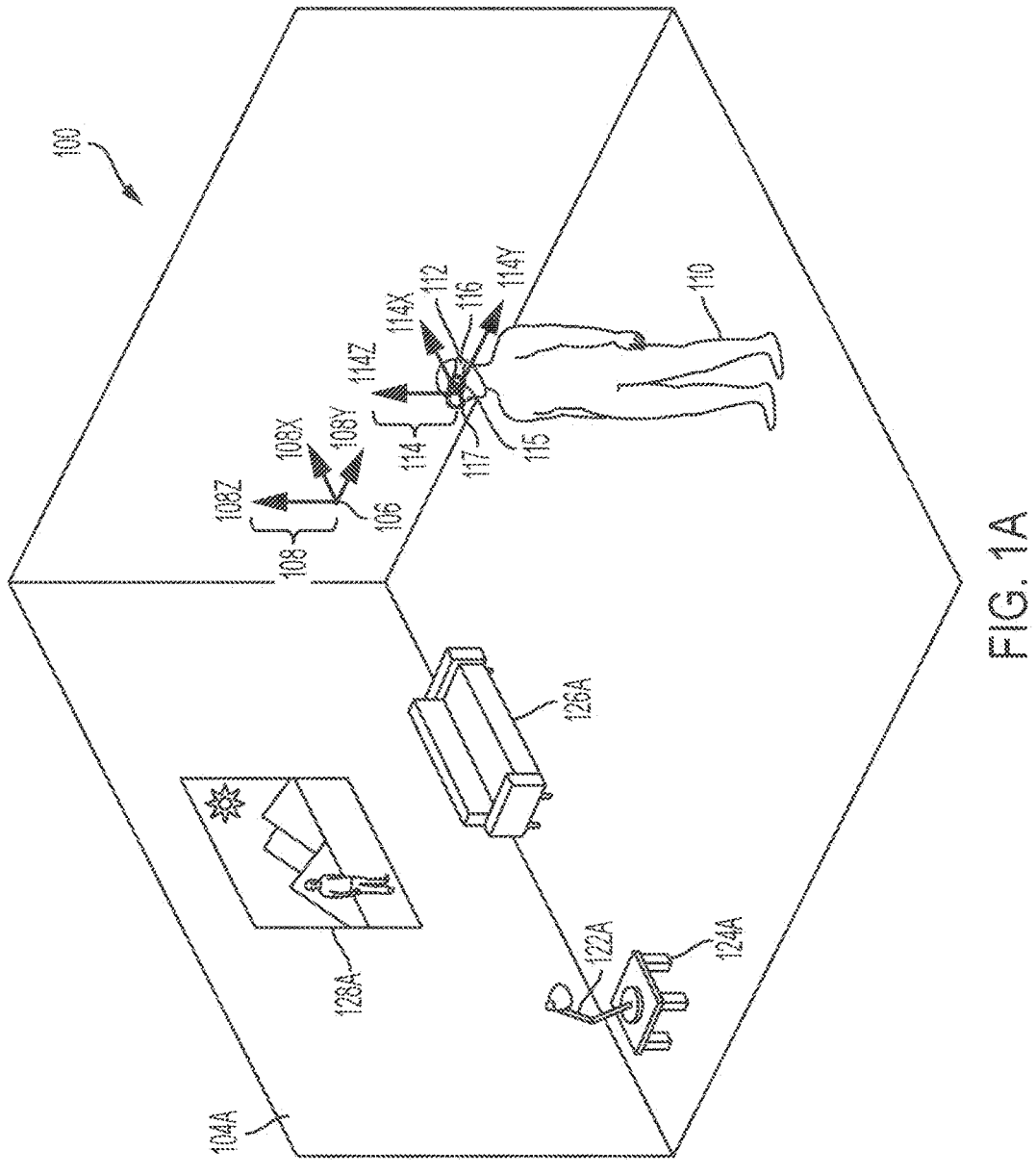
FIGS. 1A-1C illustrate an exemplary mixed reality environment, according to one or more embodiments of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the head-mounted wearable unit. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted above, a user cannot directly perceive or interact with a virtual environment—a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an example real environment 100 in which a user 110 uses a mixed reality system 112. Mixed reality system 112 may comprise a display (e.g., a transmissive display) and one or more speakers, and one or more sensors (e.g., a camera), for example as described below. The real environment 100 shown comprises a rectangular room 104A, in which user 110 is standing; and real objects

122A (a lamp), 124A (a table), 126A (a sofa), and 128A (a painting). Room 104A further comprises a location coordinate 106, which may be considered an origin of the real environment 100. As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
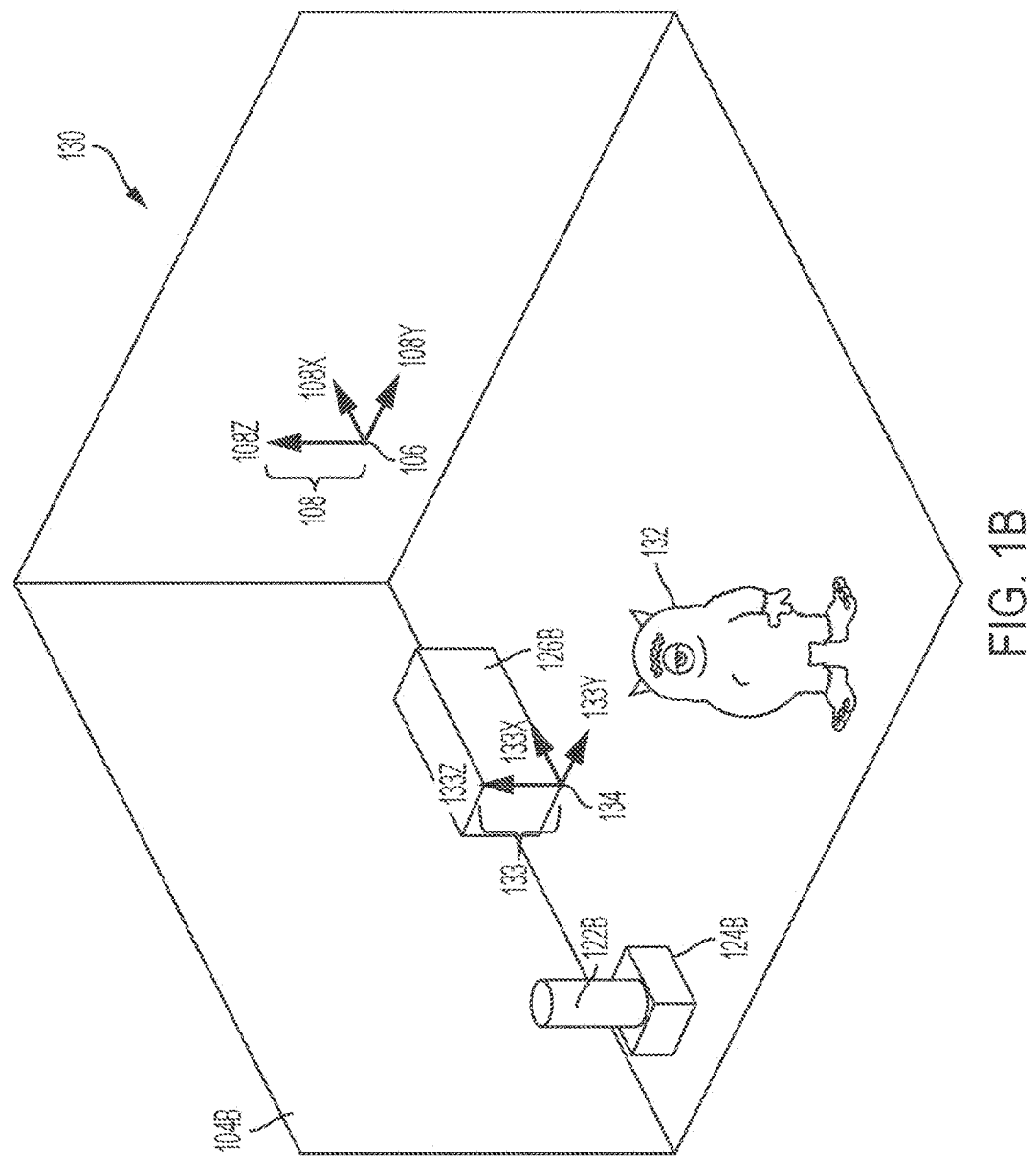

FIG. 1B illustrates an example virtual environment 130 that corresponds to real environment 100. The virtual environment 130 shown comprises a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, and 126A. Virtual environment 130 additionally comprises a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/ with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

Persistent coordinate data may be coordinate data that persists relative to a physical environment. Persistent coordinate data may be used by MR systems (e.g., MR system 112, 200) to place persistent virtual content, which may not be tied to movement of a display on which the virtual object is being displayed. For example, a two-dimensional screen may only display virtual objects relative to a position on the screen. As the two-dimensional screen moves, the virtual content may move with the screen. In some embodiments, persistent virtual content may be displayed in a corner of a room. A MR user may look at the corner, see the virtual content, look away from the corner (where the virtual content may no longer be visible because the virtual content may have moved from within the user's field of view to a location outside the user's field of view due to motion of the user's head), and look back to see the virtual content in the corner (similar to how a real object may behave).

In some embodiments, persistent coordinate data (e.g., a persistent coordinate system and/or a persistent coordinate frame) can include an origin point and three axes. For example, a persistent coordinate system may be assigned to a center of a room by a MR system. In some embodiments, a user may move around the room, out of the room, re-enter the room, etc., and the persistent coordinate system may remain at the center of the room (e.g., because it persists relative to the physical environment). In some embodiments, a virtual object may be displayed using a transform to persistent coordinate data, which may enable displaying persistent virtual content. In some embodiments, a MR system may use simultaneous localization and mapping to generate persistent coordinate data (e.g., the MR system may assign a persistent coordinate system to a point in space). In some embodiments, a MR system may map an environment by generating persistent coordinate data at regular intervals (e.g., a MR system may assign persistent coordinate systems in a grid where persistent coordinate systems may be at least within five feet of another persistent coordinate system).

In some embodiments, persistent coordinate data may be generated by a MR system and transmitted to a remote server. In some embodiments, a remote server may be configured to receive persistent coordinate data. In some embodiments, a remote server may be configured to synchronize persistent coordinate data from multiple observation instances. For example, multiple MR systems may map the same room with persistent coordinate data and transmit that data to a remote server. In some embodiments, the remote server may use this observation data to generate canonical persistent coordinate data, which may be based on the one or more observations. In some embodiments, canonical persistent coordinate data may be more accurate and/or reliable than a single observation of persistent coordinate data. In some embodiments, canonical persistent coordinate data may be transmitted to one or more MR systems. For example, a MR system may use image recognition and/or location data to recognize that it is located in a room that has corresponding canonical persistent coordinate data (e.g., because other MR systems have previously mapped the room). In some embodiments, the MR system may receive canonical persistent coordinate data corresponding to its location from a remote server.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 1C:
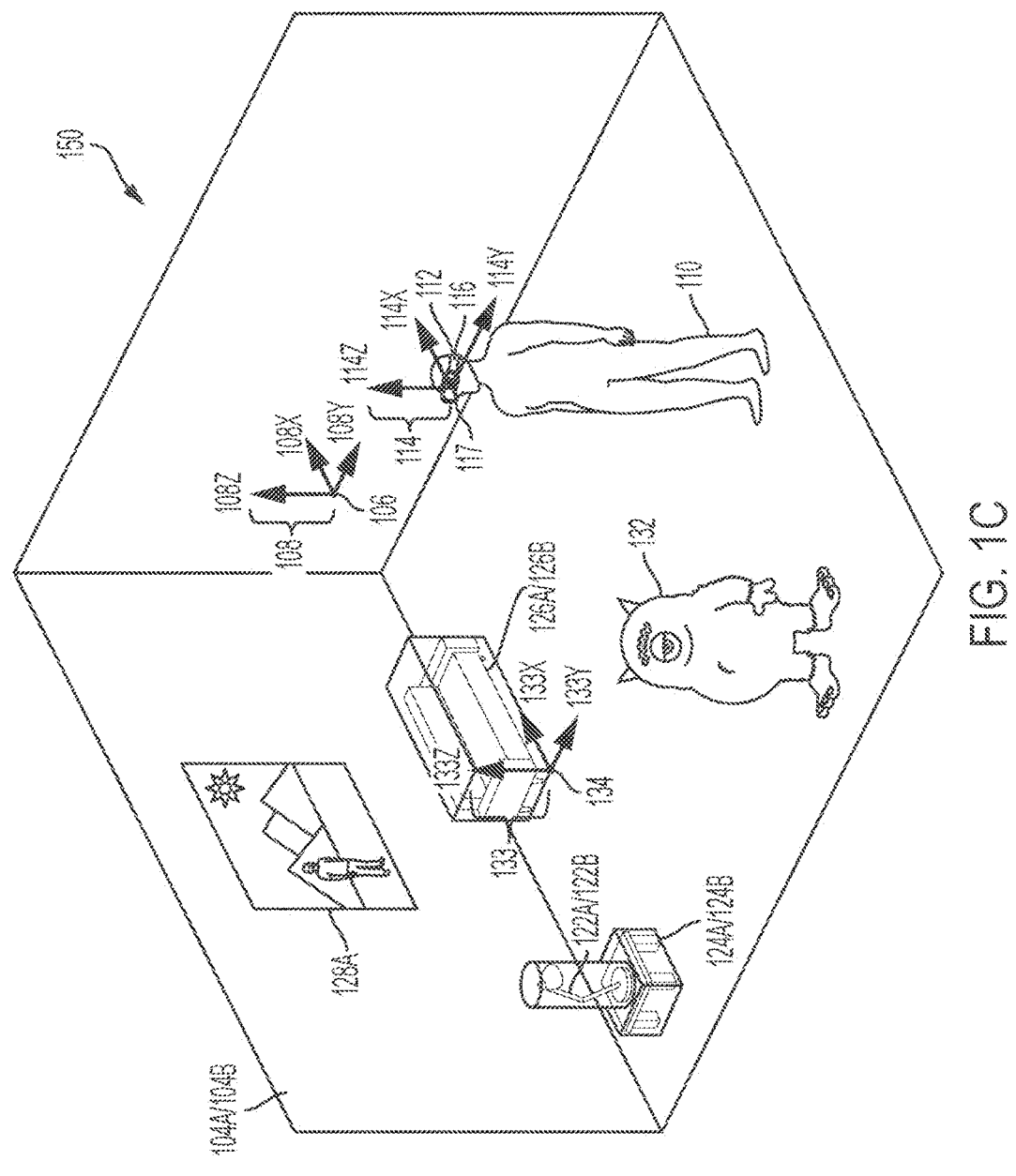

FIG. 1C illustrates an example MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As above, origin point 106 acts as an origin for a coordinate space corresponding to MRE 150, and coordinate system 108 defines an x-axis, y-axis, and z-axis for the coordinate space.

In the example shown, mixed reality objects comprise corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described above may also incorporate audio aspects. For instance, in MRE 150, virtual monster 132 could be associated with one or more audio signals, such as a footstep sound effect that is generated as the monster walks around MRE 150. As described further below, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example Mixed Reality System

Example mixed reality system 112 can include a wearable head device (e.g., a wearable augmented reality or mixed reality head device) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU) (e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described further below.

Figure 2A:
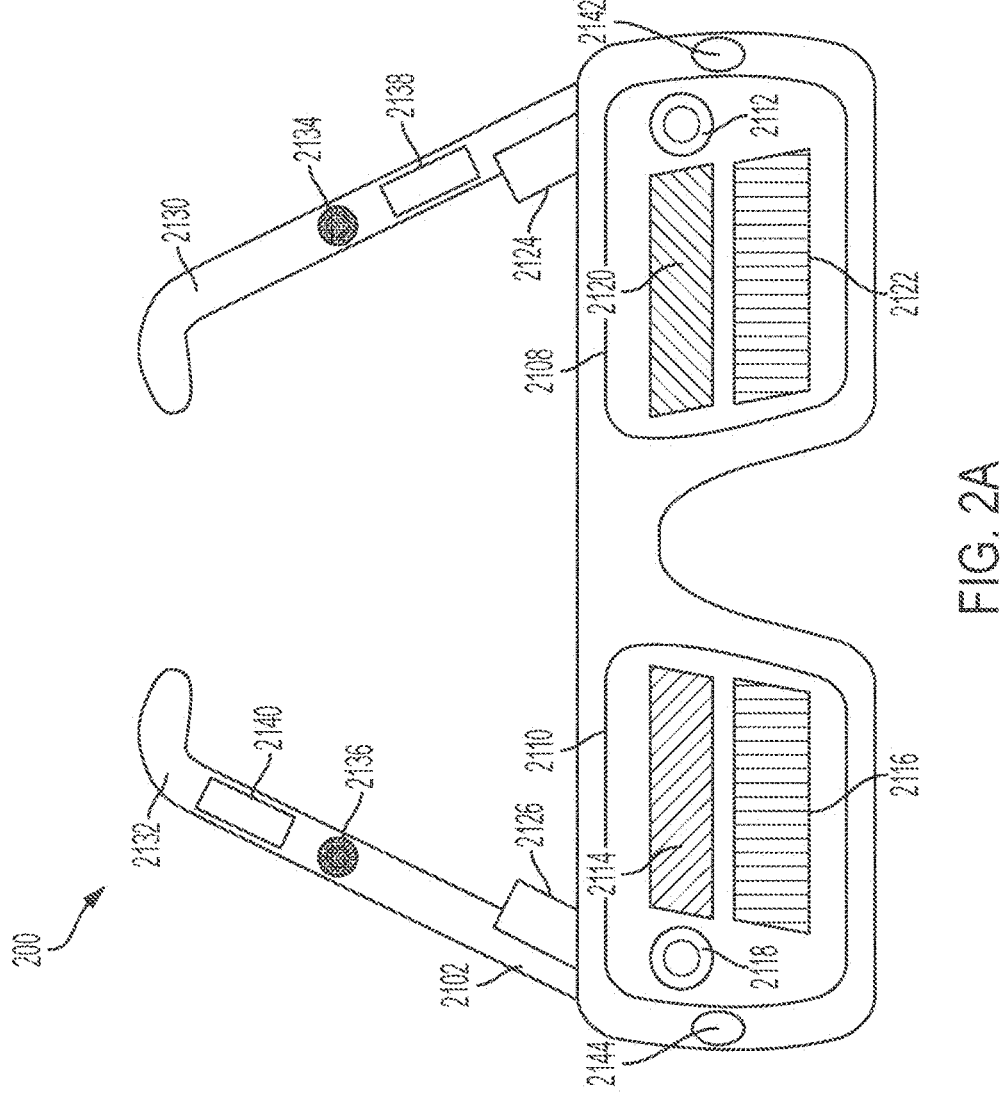
FIGS. 2A-2D illustrate components of an exemplary mixed reality system that can be used to generate and interact with a mixed reality environment, according to one or more embodiments of the disclosure.
Figure 2B:
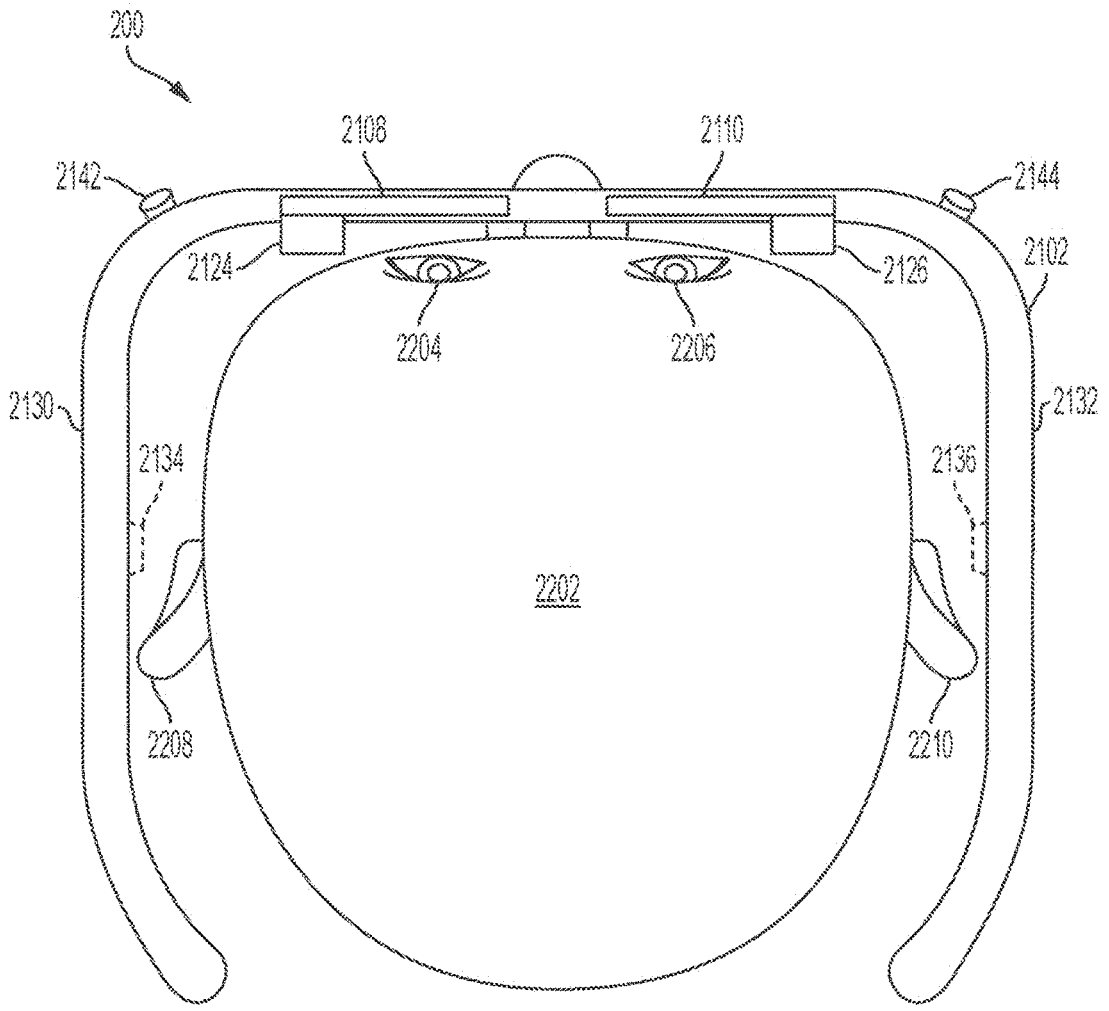
Figure 2C:
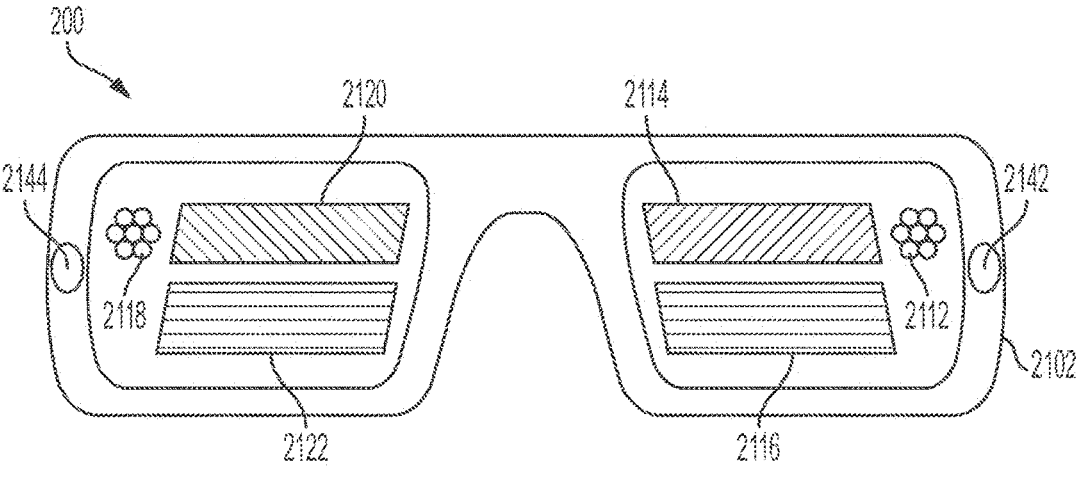
Figure 2D:
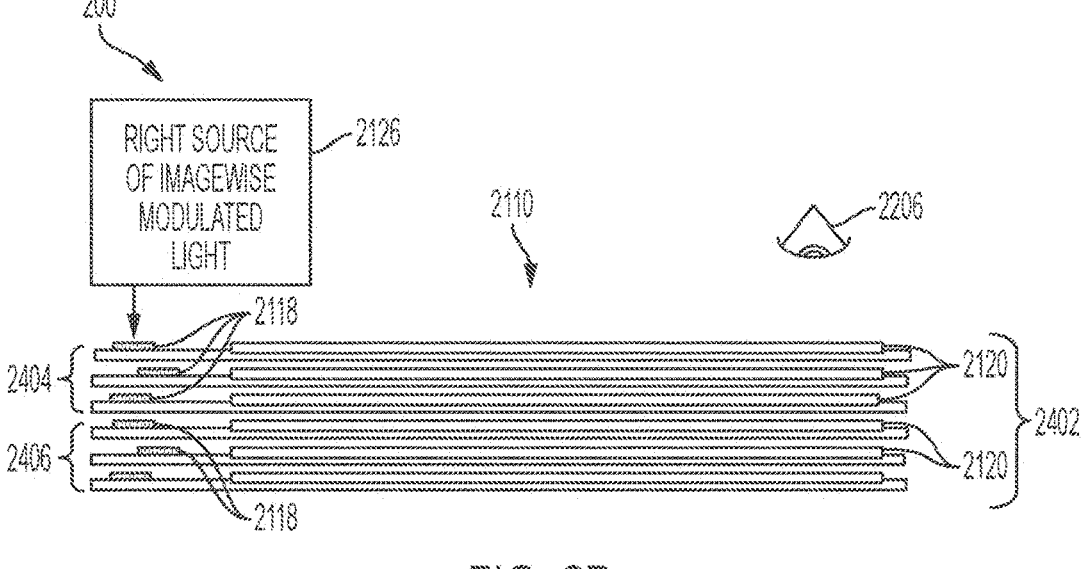

FIGS. 2A-2D illustrate components of an example mixed reality system 200 (which may correspond to mixed reality system 112) that may be used to present a MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an example left eyepiece (e.g., a left transparent waveguide set eyepiece) 2108 and an example right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left in-coupling grating set 2112, a left orthogonal pupil expansion (OPE) grating set 2120, and a left exit (output) pupil expansion (EPE) grating set 2122. As used herein, a pupil may refer to the exit of light from an optical element such as a grating set or reflector. Similarly, the right eyepiece 2110 can include a right in-coupling grating set 2118, a right OPE grating set 2114 and a right EPE grating set 2116. Imagewise modulated light can be transferred to a user's eye via the in-coupling gratings 2112 and 2118, OPEs 2114 and 2120, and EPE 2116 and 2122. Each in-coupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the in-coupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left in-coupling grating set 2112, and a right source of imagewise modulated light 2126 can be optically coupled into the right eyepiece 2110 through the right in-coupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (μLED) or micro Organic Light Emitting Diode (μOLED) panels coupled into the in-coupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 2D, the structure of the left eyepiece 2108 is analogous to the structure of the right eyepiece 2110.)

Figure 3A:
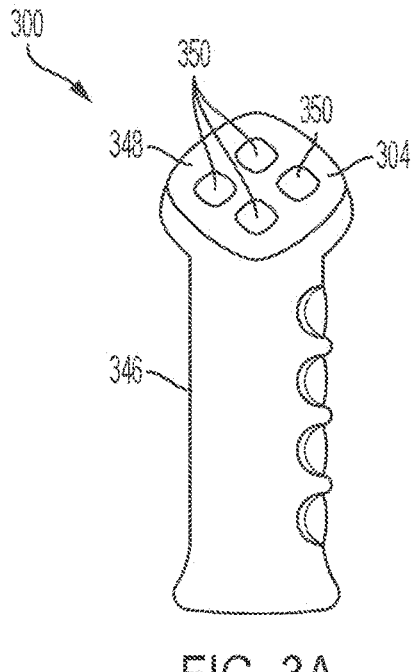
FIG. 3A illustrates an exemplary mixed reality handheld controller that can be used to provide input to a virtual reality environment, according to one or more embodiments of the disclosure.

FIG. 3A illustrates an example handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
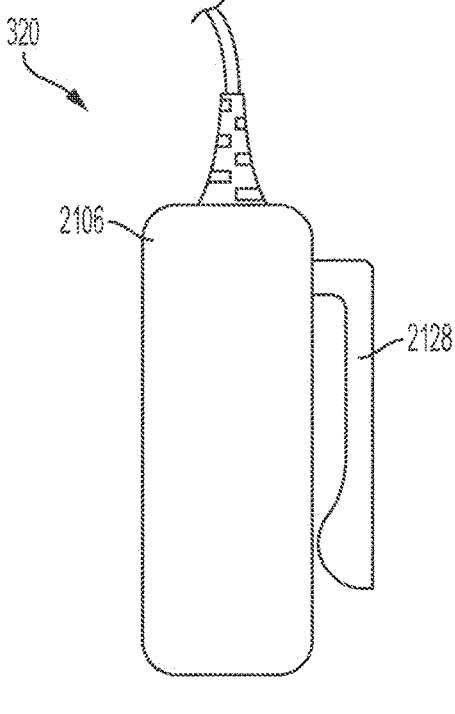
FIG. 3B illustrates an exemplary auxiliary unit that can be used with an example virtual reality system, according to one or more embodiments of the disclosure.

FIG. 3B illustrates an example auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
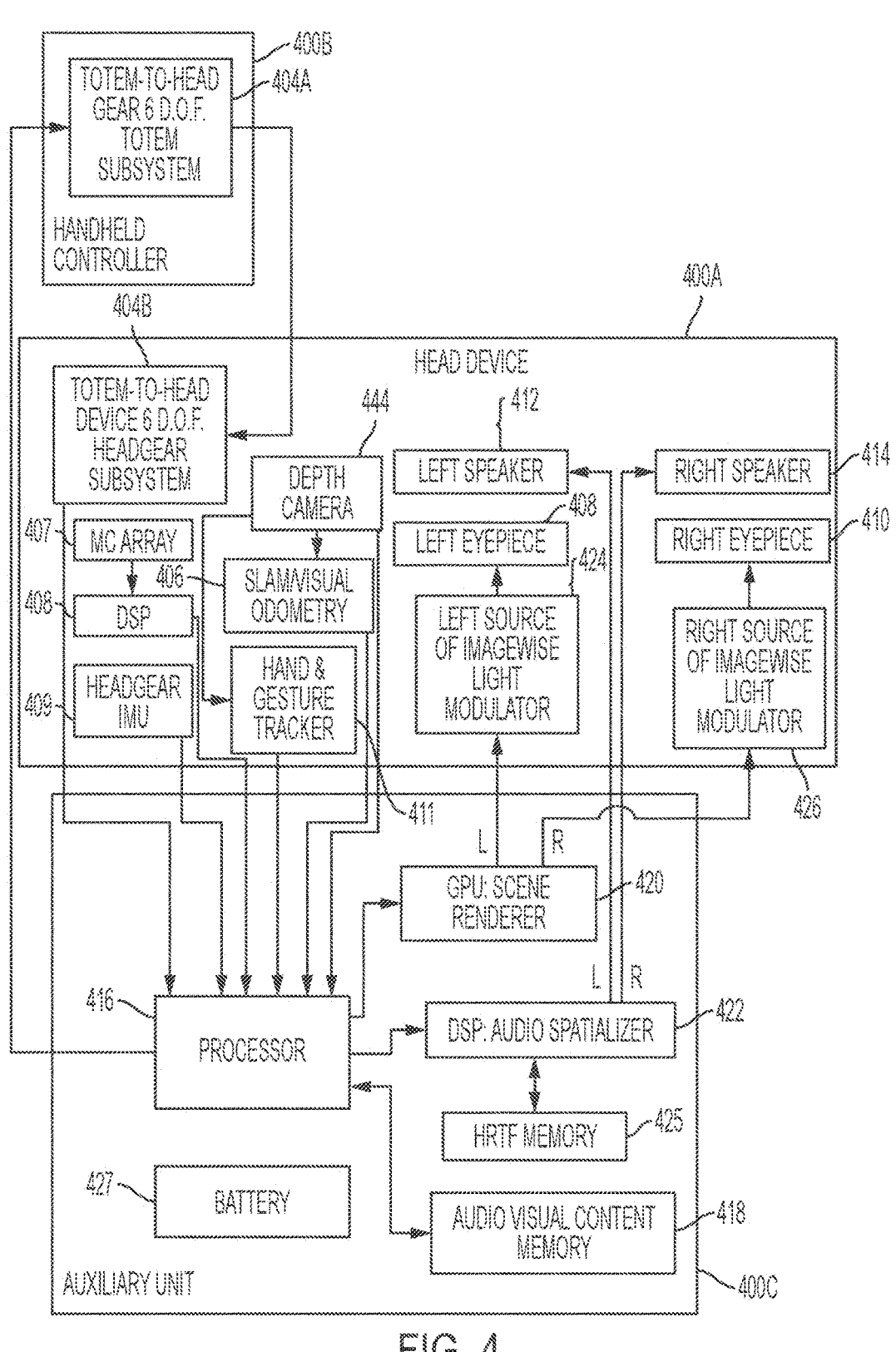
FIG. 4 illustrates an exemplary functional block diagram for an example virtual reality system, according to one or more embodiments of the disclosure.

FIG. 4 shows an example functional block diagram that may correspond to an example virtual reality system, such as mixed reality system 200 described above (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described above, or dedicated optical targets included in the handheld controller 400B) can be used for 6DOF tracking. In some examples, the handheld controller 400B can include a camera, as described above; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals.

By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some embodiments, wearable system 400 can include microphone array 407, which can include one or more microphones arranged on headgear device 400A. In some embodiments, microphone array 407 can include four microphones. Two microphones can be placed on a front face of headgear 400A, and two microphones can be placed at a rear of head headgear 400A (e.g., one at a back-left and one at a back-right). In some embodiments, signals received by microphone array 407 can be transmitted to DSP 408. DSP 408 can be configured to perform signal processing on the signals received from microphone array 407. For example, DSP 408 can be configured to perform noise reduction, acoustic echo cancellation, and/or beamforming on signals received from microphone array 407. DSP 408 can be configured to transmit signals to processor 416.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described above with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described above). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example mixed reality system, various other suitable arrangements of these components will become apparent to those skilled in the art. For example, elements presented in FIG. 4 as being associated with auxiliary unit 400C could instead be associated with the wearable head device 400A or handheld controller 400B. Furthermore, some mixed reality systems may forgo entirely a handheld controller 400B or auxiliary unit 400C. Such changes and modifications are to be understood as being included within the scope of the disclosed examples.

Virtual Reality Environment for Multiple Participants

Facilitating natural conversation in a virtual reality or mixed reality environment among multiple participants can present several challenges. For example, in a real world environment a speaker can moderate their voice, e.g., raise their volume, whisper, modulate inflections, when talking to one or more people in order to reach an intended audience. For instance, a speaker can whisper to ensure that only their neighbor can hear them or raise their voice to get the attention of an entire room. Accordingly, there exists a need for a system to provide a conversation environment that mimics a real world environment, where characteristics associated with a speaker's voice can impact who can hear the speaker.

To the extent that the following examples are described with respect to a virtual environment, a skilled artisan would understand that a similar system can be applied to a mixed reality environment and/or an augmented reality environment.

Figure 5:
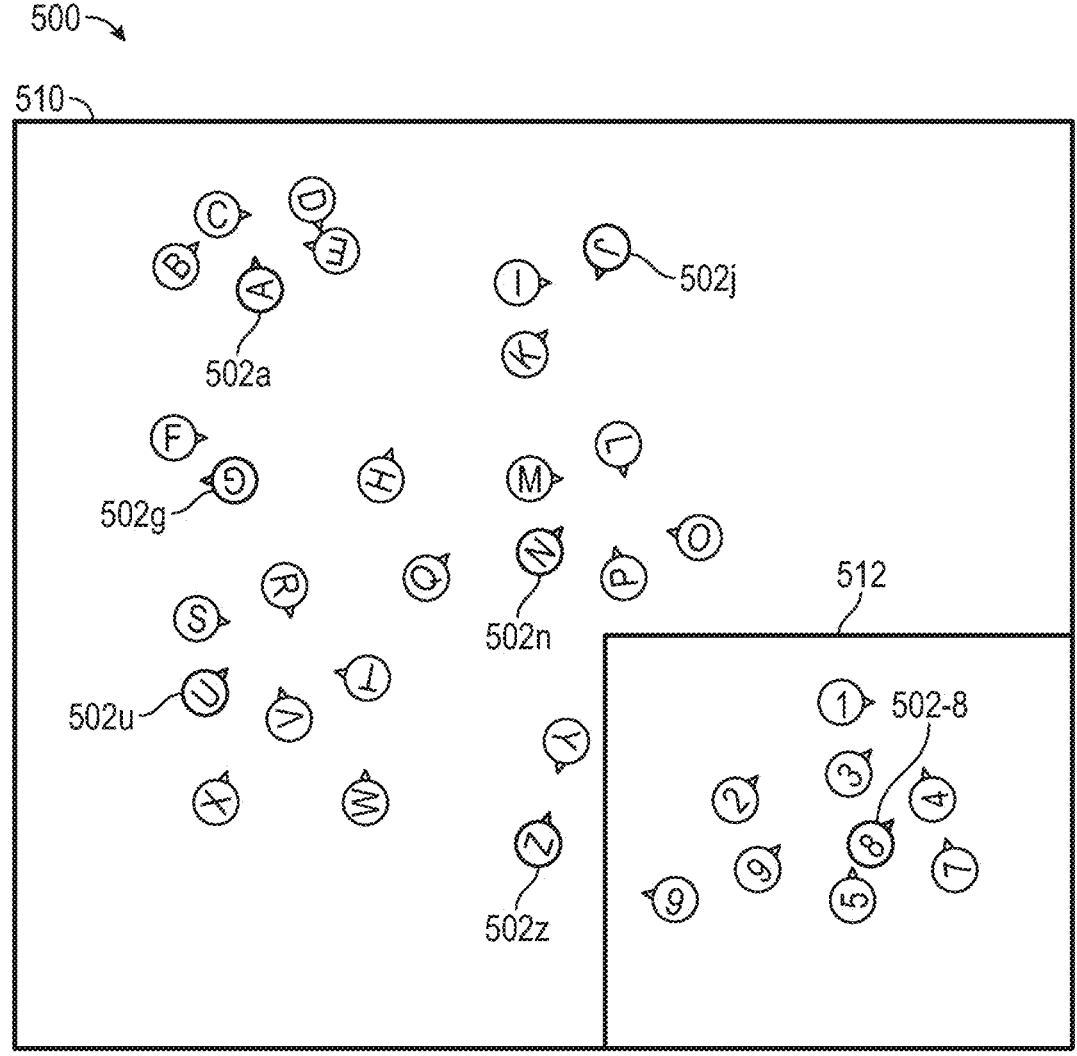
FIG. 5 illustrates an exemplary virtual reality environment, according to one or more embodiments of the disclosure.

FIG. 5 illustrates an example virtual reality environment 500, according to one or more embodiments of the disclosure. In some embodiments, the example virtual reality environment 500 can include two or more participants. In some embodiments, the example virtual reality environment 500 can correspond to a social gathering, e.g., cocktail party, mixer, wedding reception, brainstorming session, and the like. As shown in the figure the virtual reality environment 500 can include one or more spaces, e.g., a first virtual space 510 and a second virtual space 512, and a plurality of participants occupying the one or more spaces. For example, a first plurality of participants A-Z may be located in a first virtual space 510 while a second plurality of participants 1-9 may be located in a second virtual space 512. In some embodiments, the first virtual space 510 and the second virtual space 512 can correspond to acoustically isolated spaces. For example, second virtual space 512 can be separated from first virtual space 510 by one or more physical or virtual barriers, e.g., walls and/or doors. In some embodiments, the second virtual space 512 can be positioned within the first virtual space 510, e.g., the second virtual space 512 may be a room within the first virtual space 510.

Figure 6:
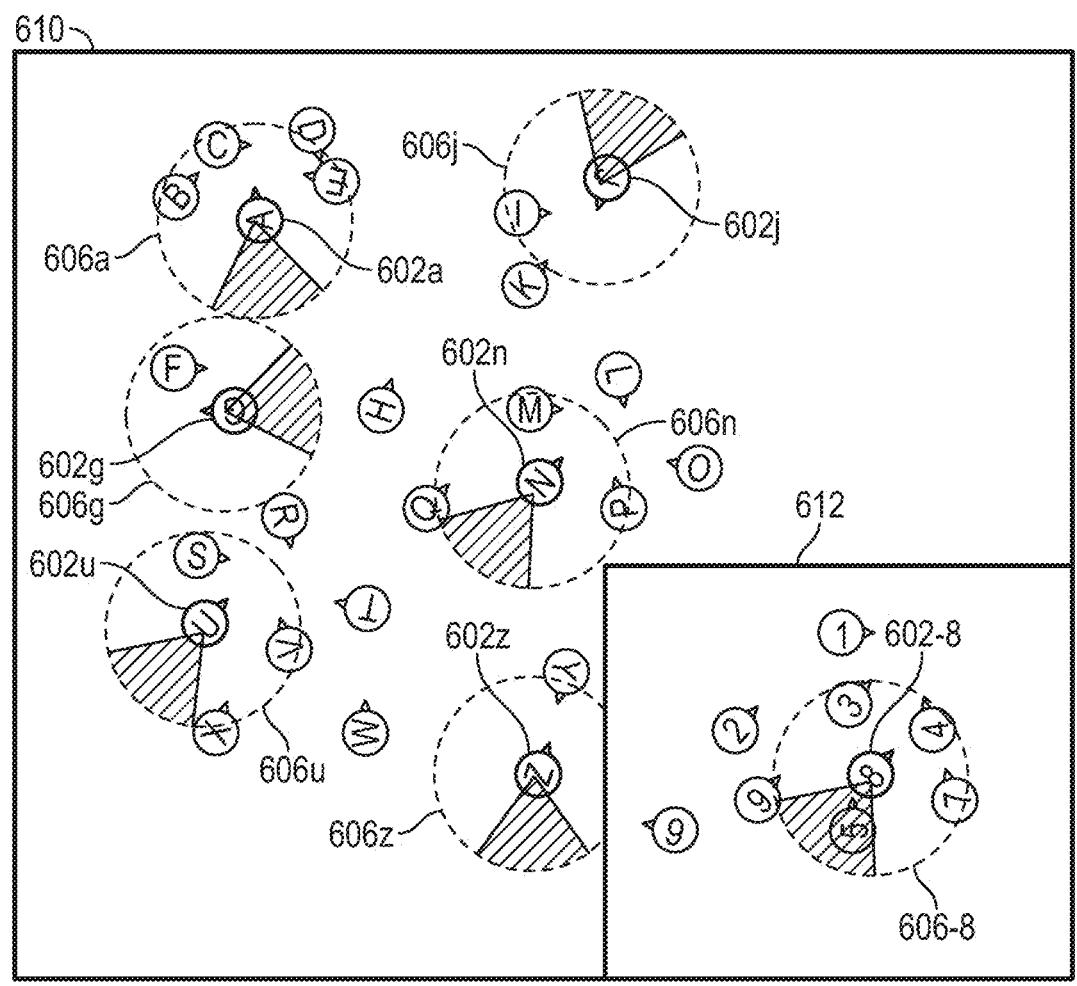
FIG. 6 illustrates an exemplary virtual reality environment, according to one or more embodiments of the disclosure.

FIG. 6 illustrates an example virtual reality environment 600, according to one or more embodiments of the disclosure. In some embodiments, the example virtual reality environment 600 can include two or more participants. In some embodiments, the example virtual reality environment 600 can correspond to a social gathering, e.g., cocktail party, mixer, wedding reception, brainstorming session, and the like. As shown in the figure the virtual reality environment 600 can include one or more spaces, e.g., a first virtual space 610 and a second virtual space 612, and a plurality of participants occupying the one or more spaces. For example, a first plurality of participants A-Z may be located in a first virtual space 610 while a second plurality of participants 1-9 may be located in a second virtual space 612. In some embodiments, the first virtual space 610 and the second virtual space 612 can correspond to acoustically isolated spaces. For example, second virtual space 612 can be separated from first virtual space 610 by one or more physical or virtual walls and/or doors. In some embodiments, the second virtual space 612 can be positioned within the first virtual space 610, e.g., the second virtual space 612 may be a room within the first virtual space 610.

In some embodiments, multiple sub-groups can form within virtual reality environment 600 among the plurality of participants where different conversations can take place in the virtual reality environment 600. For example, as shown in the figure, participants A-E can form a first sub-group, where participant A is speaking. In some embodiments, participants A, G, J, N, U, Z and 8, can be speaking. In some embodiments, participants A, G, J, N, U, Z and 8, can be speaking simultaneously. In some embodiments, an acoustic propagation region corresponding to each of the speakers can be determined using a distance-based attenuation model. In some embodiments, the acoustic propagation region can correspond to a region where any participants within the region can hear the speech of the speaker. In some embodiments, the distance-based attenuation model can include a maximum distance, such that the volume of the speaker may fall to zero when a listener is located farther than the maximum distance. In some embodiments, the absolute amplitude level of the speaker's voice can be limited by the one or more attenuation parameters associated with the maximum distance. In some embodiments, the maximum distance can establish the acoustic propagation region, where the speech of a speaker can be heard. In some embodiments, the distance-based attenuation model can decrease volume and spectral characteristics of sound for a listener as the distance between the listener and the speaker increases. In one or more examples, attenuation of sound can be frequency sensitive. For example, higher frequencies may fall off more quickly than lower frequencies the maximum distance for higher frequencies may be less, e.g., the maximum distance for lower frequencies may be greater than the maximum distance for higher frequencies.

In some examples, applying the distance-based attenuation model to speaker 602a (e.g., participant A) may establish an acoustic propagation region 606a. As shown in the figure, the radius of acoustic propagation region 606a can correspond to the maximum distance. In some embodiments, participants located within the acoustic propagation region 606a, e.g., Participants B, C, D, and E, can hear the speech of speaker 602a. Conversely, participants that are not located within the acoustic propagation region 606a, e.g., beyond the maximum distance, such as participants F and H may be unable to hear the speech of speaker 602a. Similarly, each of the speakers 602g, 602j, 602n, 602u, 602z, and 602-8 can have a respective acoustic propagation region, e.g., 606g, 606j, 606n, 606u, 606z, and 606-8. In some embodiments, speech audio data of a speaker's speech may be included in environmental processing, e.g., room reverberation propagation of the room for listeners outside the maximum distance.

While the conversation environment illustrated in FIG. 6 can facilitate conversations in within sub-groups, in some examples, a speaker, e.g., speaker 602a, may desire to address the participants outside the sub-group and/or acoustic propagation region 606a. For example, the virtual reality environment can correspond to a virtual brainstorming session and that speaker 602a would like to address the first plurality of participants, e.g., participants B-Z, in first virtual space 610 to inform them that they should wrap up the current brainstorming session. If speaker 602a were in a real world environment, speaker 602a could easily raise her voice, e.g., increase her volume and shout, to get the attention of the room. However, using the application of the distance-based attenuation model, speaker 602a may be unable to get the attention of participants outside of her sub-group by raising her voice.

In some examples, the speaker 602a can manually change one or more acoustic parameters to enable more participants to hear the speaker 602a. For example, increasing the maximum distance may enable speaker 602a to address the first plurality of participants B-Z. In some examples, the virtual reality environment 600 can include a virtual microphone, which can increase the maximum distance and allow speaker 602a to address the first plurality of participants B-Z located in the first virtual space. However, this process for modifying one or more acoustic parameters can be cumbersome and unintuitive. For example, a speaker may have to manually configure one or more settings, e.g., bring up a user interface to modify the propagation parameters.

Figure 7:
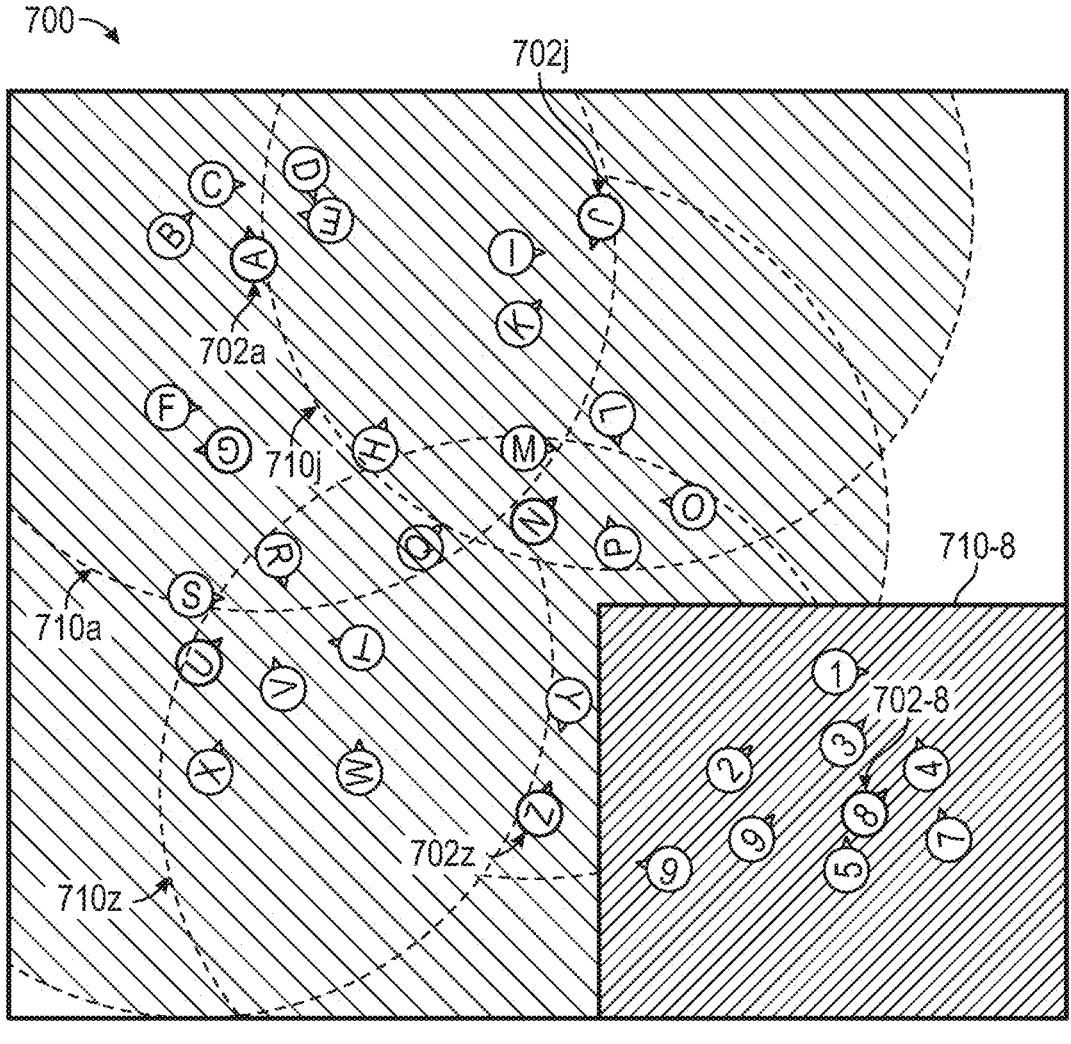
FIG. 7 illustrates an exemplary virtual reality environment, according to one or more embodiments of the disclosure.

In some embodiments, the virtual reality environment can manually change one or more acoustic parameters to increase the acoustic propagation region for each of the participants. Such an exemplary virtual reality environment is illustrated in FIG. 7. Virtual reality environment 700 can include a first virtual space 710 and a second virtual space 712, as discussed above. As shown in the figure, one or more acoustic parameters can be modified to enable each speaker, e.g., speakers 702a, 702g, 702j, 702n, 702u, 702z, in the first virtual space 710, to address a greater number of the first plurality of participants B-Z. In this manner, speaker 702a can address a greater number of participants with the acoustic propagation region 706a compared to speaker 602a who has an acoustic propagation region 606a. For example, the acoustic propagation region 706a corresponding to speaker 702a may include participants B-K, M, and Q-S, while acoustic propagation region 606a may include participants B-E.

However, the virtual reality environment 700 may burden the first plurality of participants A-Z with an increased cognitive load. For example, as shown in the figure, participants F-K, M, and Q-S may be participating in conversations separate from speaker 702a. For example, participants F and G may be part of a different sub-group and participating in a separate conversation. As shown in the figure, participants F and G are within the acoustic propagation region 706a corresponding to speaker 702a and acoustic propagation region 706u corresponding to speaker 702u. In this manner, as participants F and G attempt to focus on their conversation, they may hear speakers 702a and 702u, which can increase their cognitive load and make it difficult to carry on their conversation. While humans can focus on a specific speaker in a noisy real world environment (e.g., the cocktail party effect), doing so can be more challenging and fatiguing when in a virtual environment.

Conversely, in some embodiments, a speaker may want to have their speech heard by a single participant. Referring to virtual environment 600, in some examples, speaker 602a may desire to say something to participant B such that only participant B can hear the speech. However, because participants C-E are also within the acoustic propagation region 606a, speaker 602a's speech may be overheard by participants C-E. For example, even if participant A attempted to whisper or speak softly to participant B (as would likely occur in a real world environment), participants C-E may still hear the speech. Further, in some embodiments, an amount of audio from participant A may be sent to environmental processing, such as room reverberation. This may enable any of the first plurality of participants, e.g., participants A-Z, in the first virtual space to hear speaker 602a via modelled reflections or parameter based reverberation simulations of the first virtual space 610.

Accordingly, it would be advantageous to facilitate a "natural" conversation in a virtual reality or mixed reality environment among multiple participants, where attributes of a speaker's voice can impact one or more acoustic parameters as it does in real life. Embodiments according to this disclosure provide methods and systems that can analyze the voice of a speaker and optionally combine additional information such as speaker and/or listener orientation, proximity, hand, body, and/or head gestures, to modify one or more speech acoustic parameters in a flexible manner, e.g., without clumsy user interfaces or unintuitive controls. For example, in some embodiments, a speaker can be heard by more participants merely by speaking more loudly, as is the case in real-world environment communication. As another example, a speaker can be heard by a single participant or a smaller group of participants by whispering.

Figure 8A:
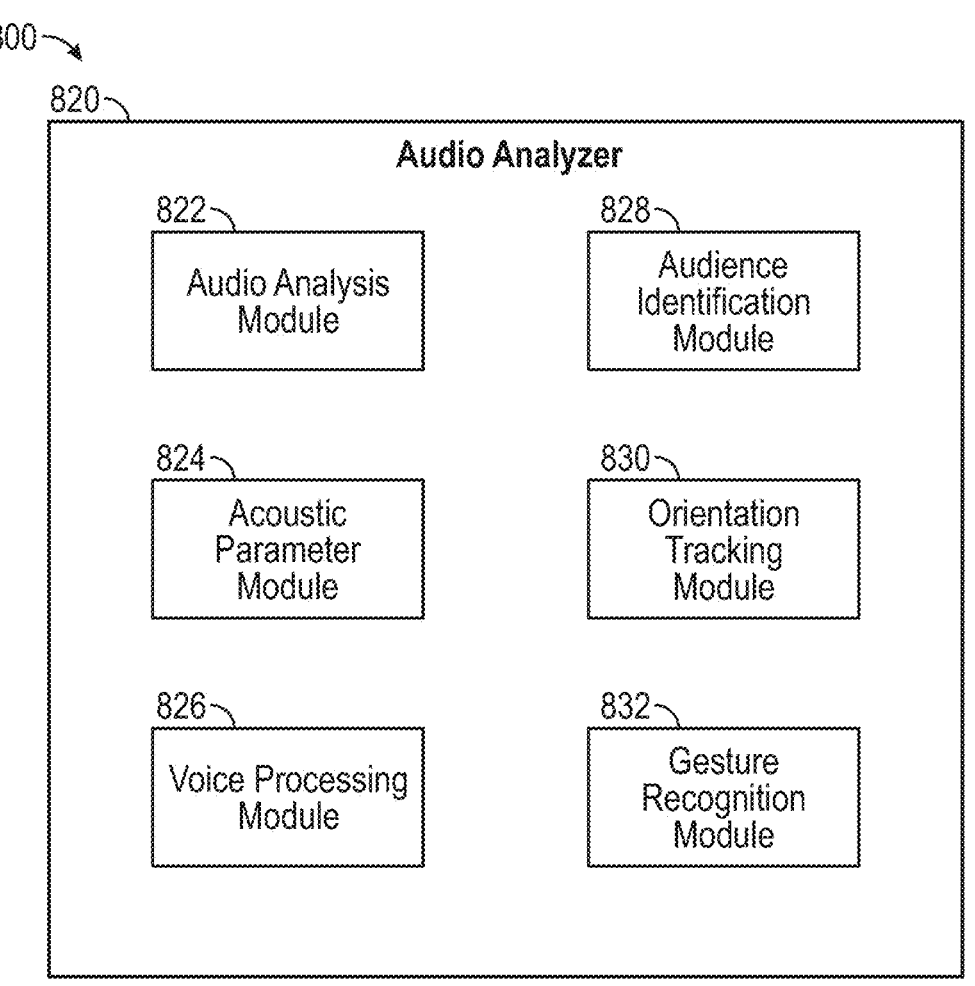
FIG. 8A-8B illustrate exemplary virtual reality systems, according to one or more embodiments of the disclosure.

FIG. 8A illustrates a virtual reality system 800 that includes an audio analyzer 820, according to one or more embodiments of the present disclosure. As shown in the figure, the audio analyzer 820 can include an audio analysis module 822, an acoustic parameter module 824, and a voice processing module 826. The audio analyzer 820 can be used to process data related to audio data of a user's speech and modify one or more acoustic parameters based on the analysis. In some embodiments, the audio analyzer 820 can further include an audience identification module 828. In some embodiments, the audio analyzer 820 can also obtain orientation data associated with the speaker's wearable head device and/or gesture data that identifies one or more gestures that a user performs concurrently with the speech. Accordingly, in some embodiments, the audio analyzer 820 can include an orientation tracking module 830 and/or a gesture recognition module 832.

Figure 9:
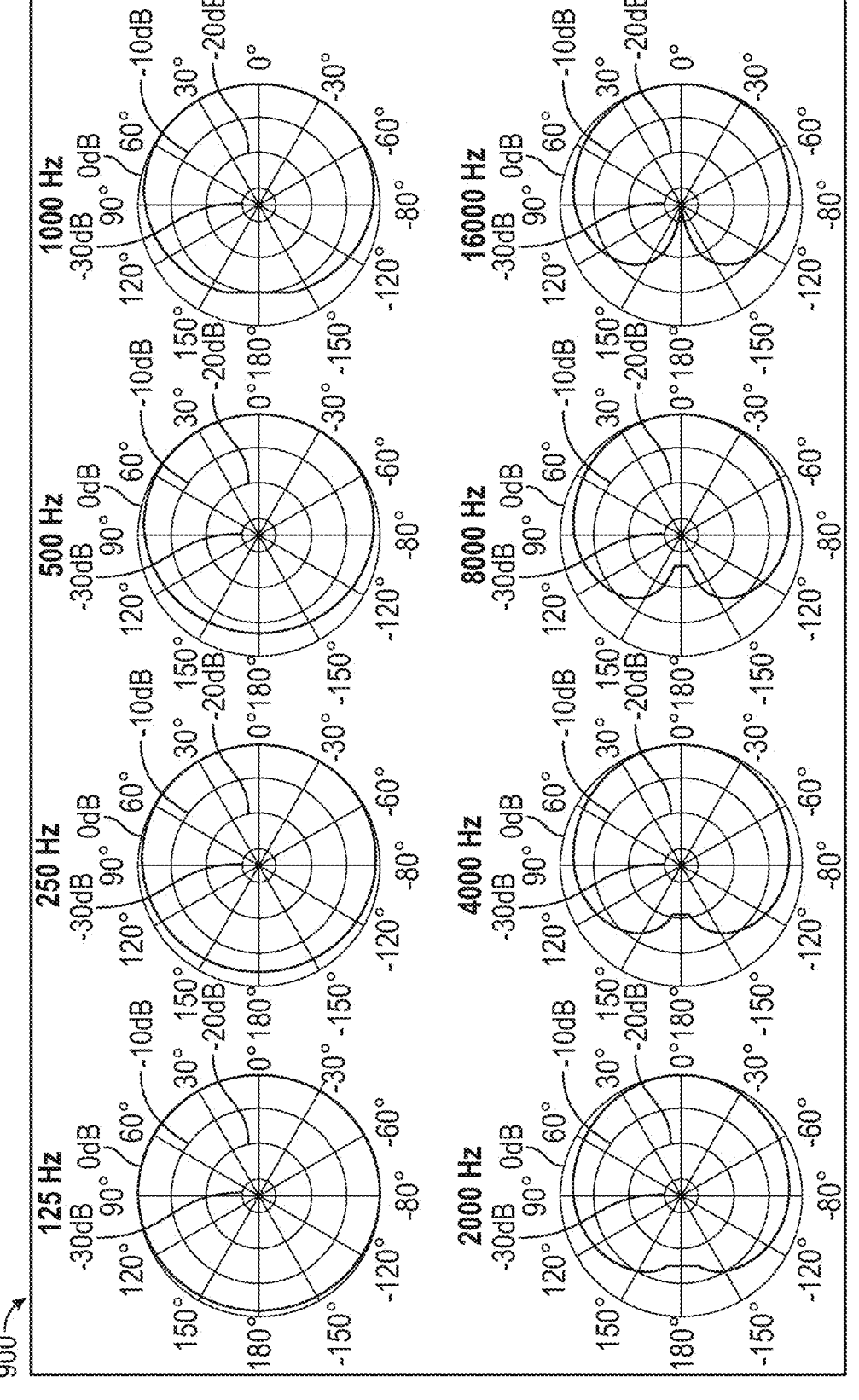
FIG. 9 illustrates exemplary audio radiation patterns, according to one or more embodiments of the disclosure.

In some embodiments, the audio analysis module 822 can analyze audio data of a speaker's speech to identify one or more voice parameters. For example, voice parameters can include, but are not limited to, intensity (e.g., volume), timbre, voice inflection, whisper, and an audio radiation, e.g., audio directivity patterns. FIG. 9 illustrates an exemplary audio radiation patterns, e.g., directivity patterns, corresponding to different frequencies 900 based on a human speaking. The audio radiation patterns can illustrate how the voice of the average speaker can travel through space based on spectral characteristics of the voice and a direction that the speaker is facing. As shown in the figure, the hypothetical speaker producing the directivity patterns 900 is facing to the right, e.g., 0°. In some embodiments, the amplitude of the directivity pattern can vary based on the frequency of the audio and a direction. For example, referring to the 8000 Hz directivity pattern, the amplitude of the directivity pattern is greatest directly in front of the speaker, e.g., 0°, the amplitude of the directivity pattern is slightly less to the side of the speaker, e.g., at 90° and −90°, while amplitude is lowest directly behind the speaker, e.g., at 180°. In some examples, the audio analysis module can analyze the speech audio data to determine an energy level, e.g., amplitude, and/or spectral distribution of the speech audio data.

In some embodiments, the acoustic parameter module 824 can determine one or more acoustic parameters based on the one or more voice parameters. In some embodiments the acoustic parameters can include but is not limited to, for example, distance attenuation, frequency dependent distance attenuation, rolloff curve type, environment modelling, environment send level, radiation based parameters (e.g., inner angle, outer angle), frequency dependent radiation gains, and maximum distance. In some embodiments, the voice processing module 826 can apply the determined acoustic parameters to the audio data of the speaker's speech to produce a spatialized audio output.

In some embodiments, the audio analyzer 820 can include an audience identification module 828. For example, the audience identification module 828 can determine the speaker's intended audience based on the one or more voice parameters identified by the audio analysis module 822. In some embodiments, the audience identification module 828 can determine the speaker's intended audience based on the one or more voice parameters and other parameters such as, but not limited to the orientation parameters and/or gesture data, e.g., angle and orientation of the speaker to the listener with respect to other listeners, head tilt of the speaker, gaze location of the speaker, hand gestures and body gestures of the speaker.

In some embodiments, the audio analyzer 820 can include an orientation tracking module 830 and/or a gesture recognition module 832. In some examples, the orientation tracking module 830 can obtain tracking data that corresponds to an orientation of the speaker's wearable head device. In some embodiments, the orientation tracking module can receive one or more data about the virtual reality environment including data about the position of the speaker and/or other participants. In some embodiments, the orientation of the speaker's wearable can be used to determine, for example, but not limited to, a head tilt of the speaker, an orientation of the speaker with respect to one or more participants, and a proximity between the speaker and one or more participants. In some examples, the gesture recognition module 832 can obtain gesture data that corresponds to one or more gestures performed by the speaker, e.g., hand gestures (e.g., raising a hand or putting an index finger or hand to their mouth), body language (e.g., leaning in or away), body orientation (e.g., facing toward or away), eye gaze direction, and interaction with objects in the real or virtual environment (e.g., clinking a wine glass, banging a gavel). In some embodiments, the orientation of the speaker's wearable head device and the gesture data can be associated with the speech audio data, e.g., the orientation and/or gestures can be identified as performed concurrently with the speaker delivering the speech.

Figures 10A, 10B:
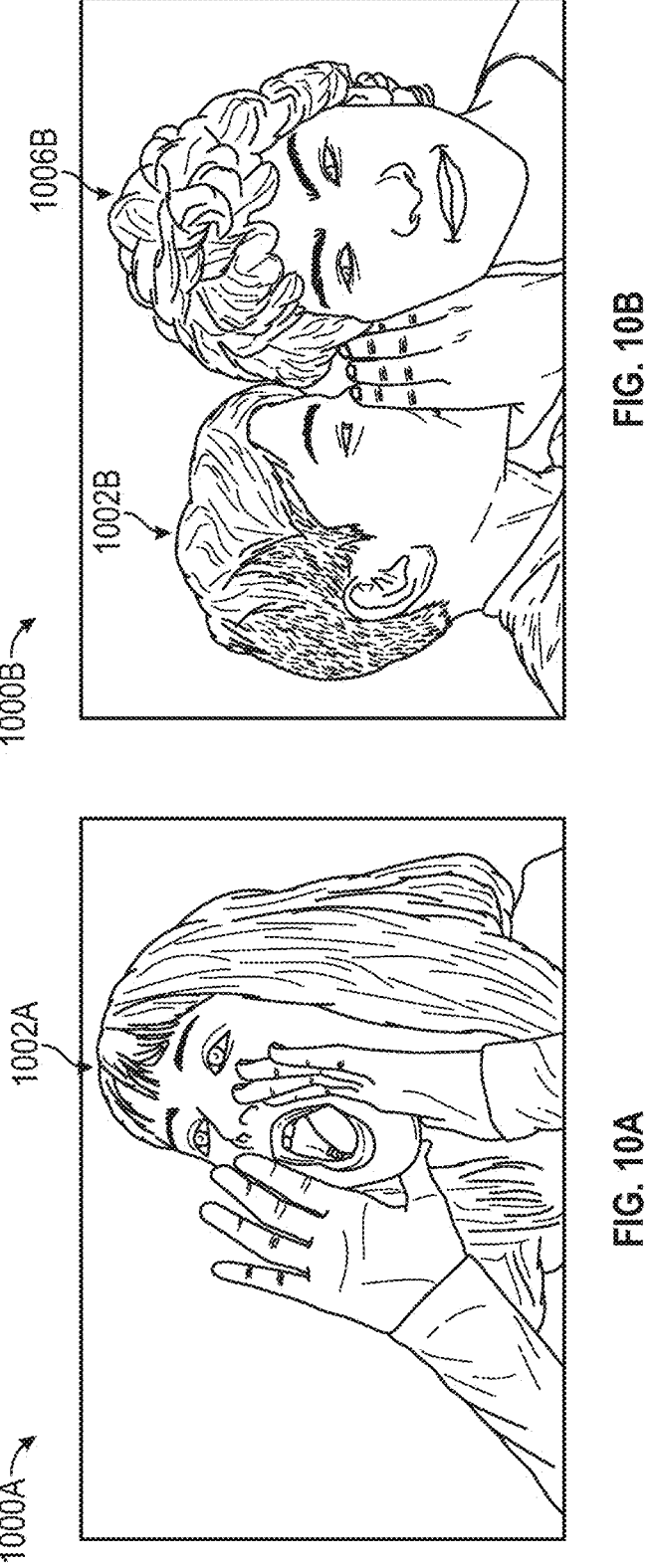
FIGS. 10A-10B illustrate exemplary speaker orientation and gestures, according to one or more embodiments of the disclosure.

FIGS. 10A-10B illustrate exemplary speaker orientation and/or gestures, according to one or more embodiments of the disclosure. FIG. 10A illustrates an exemplary speaker 1002A shouting, according to one or more embodiments of the disclosure. In some examples, the orientation tracking module 830 may determine that the head of the speaker 1002A is inclined slightly upward, which can be indicative of the speaker 1002A attempting to have their speech reach more listeners. In some examples, the gesture recognition module 832 may determine that the speaker 1002A has cupped their hands to their mouth, which can be indicative of the speaker 1002A attempting to have their speech reach more listeners. In some embodiments, the combination of the inclined head and the cupped hands can improve the strength of the indication that the speaker 1002A attempting to have their speech reach more listeners. For example, the hands cupped to the speaker's mouth may not always be indicative of the speaker attempting to have their speech reach more listeners, but the cupped hands gesture in combination with the inclined head and/or voice parameters indicating a raised voice, can indicate that the speaker may be attempting to have their speech reach more listeners.

FIG. 10B illustrates an exemplary speaker 1002B whispering, according to one or more embodiments of the disclosure. In some examples, the orientation tracking module 830 may determine that the head of the speaker 1002B is directed toward a particular listener, which can be indicative of the speaker 1002B attempting to have their speech directed at the particular listener 1006B. In some examples, the gesture recognition module 832 may determine that the speaker 1002A has cupped their hands to their mouth. In some examples, the combination of the cupped hands with the orientation of the speaker 1002A and/or voice parameters indicating a hushed or whispering voice can strongly indicate that the speaker may be attempting to have their speech directed at a particular listener, e.g., listener 1006B.

The audience identification module 828 can identify the intended audience of the speaker based on one or more voice parameters, orientation parameters and/or gesture data. For example, referring to speaker 1002A, one or more listeners located in the same virtual space, e.g., space 510 or 512, as the speaker can be determined to be the intended audience based on one or more voice parameters indicating a raised voice, orientation parameters indicating an inclined head, and gesture data indicating hands cupped to the speaker's mouth. As another example, referring to speaker 1002B, listener 1006B can be determined to be the intended audience based on one or more of voice parameters indicating a hushed or whispering voice, orientation parameters indicating the speaker 1002B is facing a listener 1006B, and gesture data indicating hands cupped to the speaker's mouth.

In some embodiments, the acoustic parameter module 824 can determine one or more acoustic parameters based on one or more voice parameters, an intended audience, orientation parameters, and/or gesture data. For example, referring to speaker 1002A, one or more acoustic parameters such as distance attenuation and maximum distance may be increased based on one or more of voice parameters indicating a raised voice, orientation parameters indicating an inclined head, and/or gesture data indicating hands cupped to the speaker's mouth. As another example, referring to speaker 1006B, one or more acoustic parameters such as distance attenuation and maximum distance may be decreased based on one or more of voice parameters indicating a hushed or whispering voice, orientation parameters indicating the speaker 1002B is facing a particular listener 1006B, and gesture data indicating hands cupped to the speaker's mouth. In some embodiments, a radiation angle corresponding to the speech of speaker 1002B may be modified to be more directional, e.g., narrower, based on the gesture data gesture data indicating hands cupped to the speaker's mouth in combination with the one or more of voice parameters indicating a hushed or whispering voice.

Figure 8B:
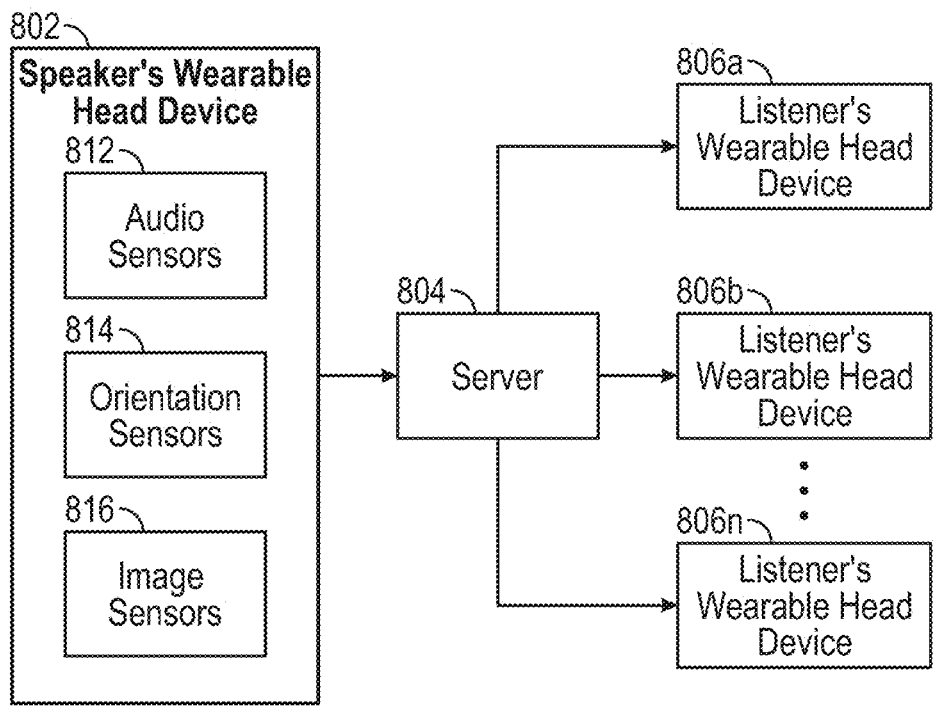

FIG. 8B illustrates a virtual reality system 800, according to one or more embodiments of the present disclosure. As shown in the figure, the virtual reality system 800 can include at least a speaker's wearable head device 802, a server 804, and one or more listener's wearable head devices 806a-806n. In some embodiments, the server 804 can be configured to communicate with, e.g., send and receive data from, the speaker's wearable head device 802. In some embodiments, the server 804 can be configured to communicate with, e.g., send and receive data from, the one or more listener's wearable head devices 806a-806n. While the following examples may be described with respect to a virtual reality system, a skilled artisan will understand that the embodiments of the present disclosure can be used with augmented reality, virtual reality, mixed reality, and/or XR systems. In some embodiments, the virtual reality system may omit the server 804, e.g., the virtual reality system can be peer-to-peer.

In some embodiments, one or more modules of the audio analyzer 820 can be located on one or more components of the virtual reality system, e.g., of the speaker's wearable head device 802, a server 804, and one or more listener's wearable head devices 806a-806n. That is, one or more modules included in audio analyzer 820 can be distributed across the speaker's wearable head device 802, a server 804, and one or more listener's wearable head devices 806a-806n. This will be discussed in greater detail below.

In some embodiments, the speaker's wearable head device 802 can include at least one or more audio sensors 812, e.g., microphone, one or more tracking components 814, e.g., inertial measurement unit (IMU), and one or more image sensors 816, e.g., a camera, depth camera, visible light receiver, and the like. In some embodiments, the one or more audio sensors 812 can be configured to detect sound and provide corresponding signals to the speaker's head wearable device. In some examples, a microphone may be attached to, or integrated with, wearable head device 802, and may be configured to detect a speaker's voice. In some embodiments, the one or more tracking components can be configured to detect a position, orientation, and/or motion of the head wearable device 802. In some embodiments, the one or more image sensors can be configured to capture one or more images of the speaker and/or the speaker's environment. In some embodiments, the speaker's wearable head device 802 can correspond to the wearable head device 2102 described above. In some embodiments, the speaker's wearable head device 802 can be configured to send data obtained by one or more sensors (e.g., the one or more audio sensors 812, one or more tracking components 814, and one or more image sensors 816) of speaker's wearable head device 802 to the server 804.

In some embodiments, the server 804 can be a remote server. In some embodiments, the server 804 may be configured to request and/or receive data from the speaker's head wearable device 802 and/or the listener's head wearable device 806a-806n. In some embodiments, the listener's wearable head devices 806a-806n can include one or more speakers to deliver a spatialized audio output that includes processed speech audio data corresponding to the speaker's speech. In some embodiments, one or more of the listener's wearable head devices 806a-806n can correspond to the wearable head device 2102 described above.

In some embodiments, the listener's wearable head devices 806a-806n can be configured to retrieve data from the server 804. The data can be associated with the speech audio data corresponding to the speaker's speech. For example, the retrieved data can include, but not be limited to the audio data of the speaker's speech and one or more acoustic parameters.

As discussed above, in some embodiments, one or more modules of the audio analyzer 820 can be located on one or more of the speaker's wearable head device 802, a server 804, and one or more listener's wearable head devices 806a-806n. For example, in some embodiments, the speaker's wearable head device 802 can process the raw data from the one or more sensors, e.g., audio sensors 812, tracking components 814, and image sensors 816. For example, the speaker's wearable head device 802 can include the audio analysis module 822 and identify one or more voice parameters based on the speech audio data received by one or more audio sensors 812.

In some embodiments, the speaker's wearable head device 802 can include the orientation tracking module 830 and obtain an orientation of the speaker's wearable head device 802 based on the orientation parameters obtained from the one or more tracking components 814. In some embodiments, the speaker's wearable head device 802 can include the gesture recognition module 832 and obtain gesture data indicative of one or more gestures performed by the speaker based on the image data obtained from the one or more image sensors 816. The orientation parameters and the gesture data can be used by the acoustic parameter module 824 (whether located on the server or speaker's wearable head device 802) to determine the one or more acoustic parameters. In some embodiments, the speaker's wearable head device 802 can include the audience identification module 828.

In some embodiments, the speaker's wearable head device 802 can determine the acoustic parameters. For example, in some embodiments, the speaker's wearable head device 802 can include the acoustic parameter module 824. In this manner, the speaker's wearable head device 802 can determine one or more acoustic parameters based on the one or more voice parameters. In some embodiments, the speaker's wearable head device 802 can include the audience identification module 828. In this manner, the speaker's wearable head device 802 can determine the speaker's intended audience based on the one or more voice parameters. In some embodiments, the one or more voice parameters and audio data of the speaker's speech can be sent to the server 804 to determine the acoustic parameters.

In some embodiments, the server 804 can process the sensor data obtained from the one or more sensors of the speaker's wearable head device 802. For example, in some embodiments, the server 804 can include the audio analysis module 822, audience identification module 828, orientation tracking module 830, and/or gesture recognition model 832. In such embodiments, speaker's wearable head device 802 can send data obtained from its one or more sensors to the server 804 for processing. In some embodiments, the server 804 can include the audience identification module 828. In some embodiments, the server can include the acoustic parameter module 824 to determine one or more acoustic parameters based on one or more of the voice parameters, orientation parameters, gesture data, and intended audience (whether determined by the server 804 or the speaker's wearable head device 802).

In some embodiments, the server 804 can spatialize the speech audio data corresponding to the speaker's speech based on the one or more acoustic parameters (whether determined by the server 804 or the speaker's wearable head device 802). For example, the server 804 can include the voice processing module 826, which can apply the determined acoustic parameters to the speech audio data.

In some embodiments, the one or more listener's wearable head devices 806a-806n can spatialize the audio data of the speaker's speech based on the one or more acoustic parameters. For example, one or more of the listener's wearable head devices 806a-806n can retrieve the speech audio data of the speaker's speech and acoustic parameters (whether determined by the server 804 or the speaker's wearable had device 802) from the server 804 and apply the acoustic parameters to the speech audio data of the speaker's speech to generate spatialized audio for a listener, e.g., a listener 806a-806n.

FIGS. 11A-11E illustrate exemplary flow charts of processes 1100A-1100E for modifying one or more parameters of audio of a speaker's speech, according to one or more embodiments of the disclosure. In some embodiments, processes 1100A-1100E can be performed on one or more components of the virtual reality system 800.

FIG. 11A illustrates an exemplary flow chart of a process 1100A for modifying one or more parameters of speech audio data corresponding to a speaker's speech, according to one or more embodiments of the disclosure. Process 1100A can determine one or more acoustic parameters of audio data of a speaker's speech based on voice parameters identified from the speech audio data. At step 1102, the virtual reality system, e.g., virtual reality system 800, can receive audio data including speech audio data from a speaker wearing a head wearable device. In some embodiments, the wearable head device can correspond to speaker's wearable head device 802. In some embodiments, speech audio data can be detected by one or more audio sensors 812 of the speaker's wearable head device 802.

At step 1104, the virtual reality system, e.g., virtual reality system 800, can identify one or more voice parameters based on the speech audio data. In some embodiments, the speaker's wearable head device 802 can identify the one or more voice parameters based on the speech audio data of the speaker's speech. The one or more voice parameters can include, for example, intensity (e.g., volume), timbre, voice inflection, and/or whisper. For example, the one or more voice parameters can be indicative of whether a user, e.g., speaker, is speaking in a normal tone, a raised tone, a lowered tone, shouting, or whispering. In some embodiments, step 1104 can be performed by the audio analysis module 822. In some embodiments, the server 804 can identify the one or more voice parameters based on the speech audio data of the user's speech. For example, the speaker's wearable head device 802 can send the audio data detected by the audio sensors 812 to the server 804 to identify the one or more voice parameters.

In some embodiments, the virtual reality system 800 can calibrate voice parameters specific to a particular user or speaker. For example, calibrating voice parameters for a particular speaker can enable the audio analyzer 820 to determine which voice parameters indicate a normal tone, whisper, raised tone, lowered tone, shouting, and the like for a particular speaker. For example, voice parameters indicative of a shout for user A may correspond to voice parameters indicative of a normal tone for speaker G. In some examples, the wearable head device can monitor a speaker's voice parameters as the speaker wears and uses the wearable head device, based on these voice parameters, the wearable head device can determine one or more thresholds of a user's voice parameters that correspond to a "normal" voice or tone, e.g., a user's voice as they are conversing regularly, a lowered tone, whispering, a raised tone, and/or a shouting voice. In some embodiments, a speaker can manually calibrate their voice parameters. For example, the head wearable device can provide the speaker with a prompt to provide an example of their normal voice, a lowered tone, whispering, a raised tone, and shouting. In some embodiments, the wearable head device can combine these calibration techniques.

At step 1106, the virtual reality system, e.g., virtual reality system 800, can determine one or more acoustic parameters based on the one or more voice parameters. As discussed above, the one or more acoustic parameters can include, for example, but is not limited to distance attenuation, frequency dependent distance attenuation, rolloff curve type, environment modelling, environment send level, radiation based parameters (e.g., inner angle, outer angle), frequency dependent radiation gains, and maximum distance. In some embodiments, step 1106 can be performed by the acoustic parameter module 824. In some embodiments, the speaker's wearable head device 802 can determine the one or more acoustic parameters. In some embodiments, the server 804 can determine one or more acoustic parameters.

For example, the virtual reality system can determine that the speaker is speaking in a normal tone. Accordingly, the virtual reality system can determine acoustic parameters corresponding to normal speech. In some examples, the virtual reality system can determine that the speaker is whispering. Accordingly, the virtual reality system can determine one or more acoustic parameters, (e.g., decrease the distance attenuation and/or maximum distance). In some examples, the virtual reality system can determine that the speaker is shouting. Accordingly, the virtual reality system can determine one or more acoustic parameters, (e.g., increase the distance attenuation and/or maximum distance).

At step 1108, the virtual reality system, e.g., virtual reality system 800, can apply the determined acoustic parameters to the speech audio data to generate spatialized audio that can be presented to a listener. In some embodiments, step 1108 can be performed by the voice processing module 826. In some embodiments, the listener's wearable head device 806a-806n can apply the acoustic parameters to the speech audio data to generate spatialized audio. In some embodiments, the server 804 can apply the acoustic parameters to the speech audio data to generate spatialized audio. In some embodiments, the spatialized audio can be output via one or more speakers of the listener's wearable head device 106a-106n.

Figure 12:
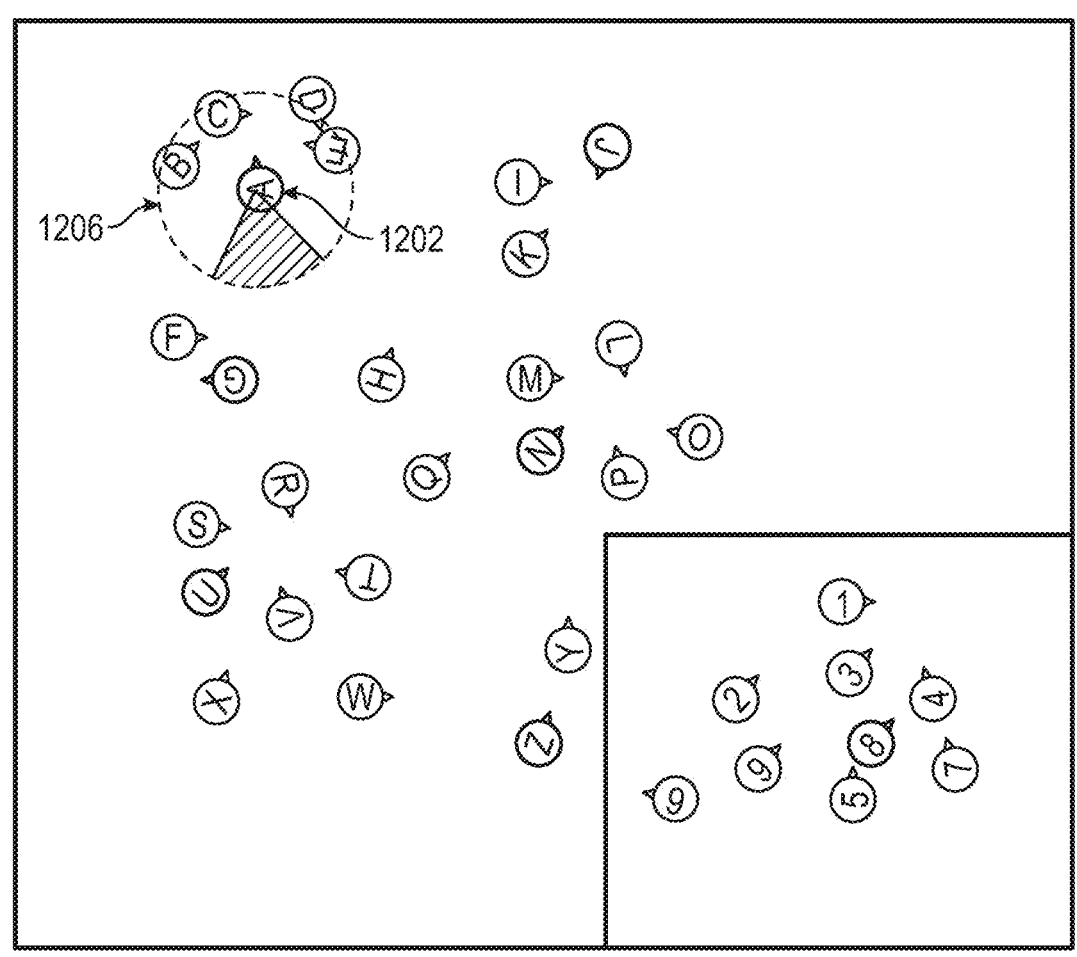
FIG. 12 illustrates an exemplary virtual reality environment, according to one or more embodiments of the disclosure.

In some examples, if the virtual reality system determines that the speaker is speaking in a normal tone and the virtual reality system can apply acoustic parameters corresponding to normal speaking patterns. FIG. 12 illustrates an exemplary virtual reality environment 1200, according to embodiments of the present disclosure. As shown in the figure, speaker 1202 is determined to be speaking in a normal tone. Accordingly, the virtual reality system can determine acoustic parameters corresponding to normal speech, which can establish acoustic propagation region 1206. As shown in the figure listeners B-E can hear the speech audio data corresponding to speaker 1202.

Figure 13:
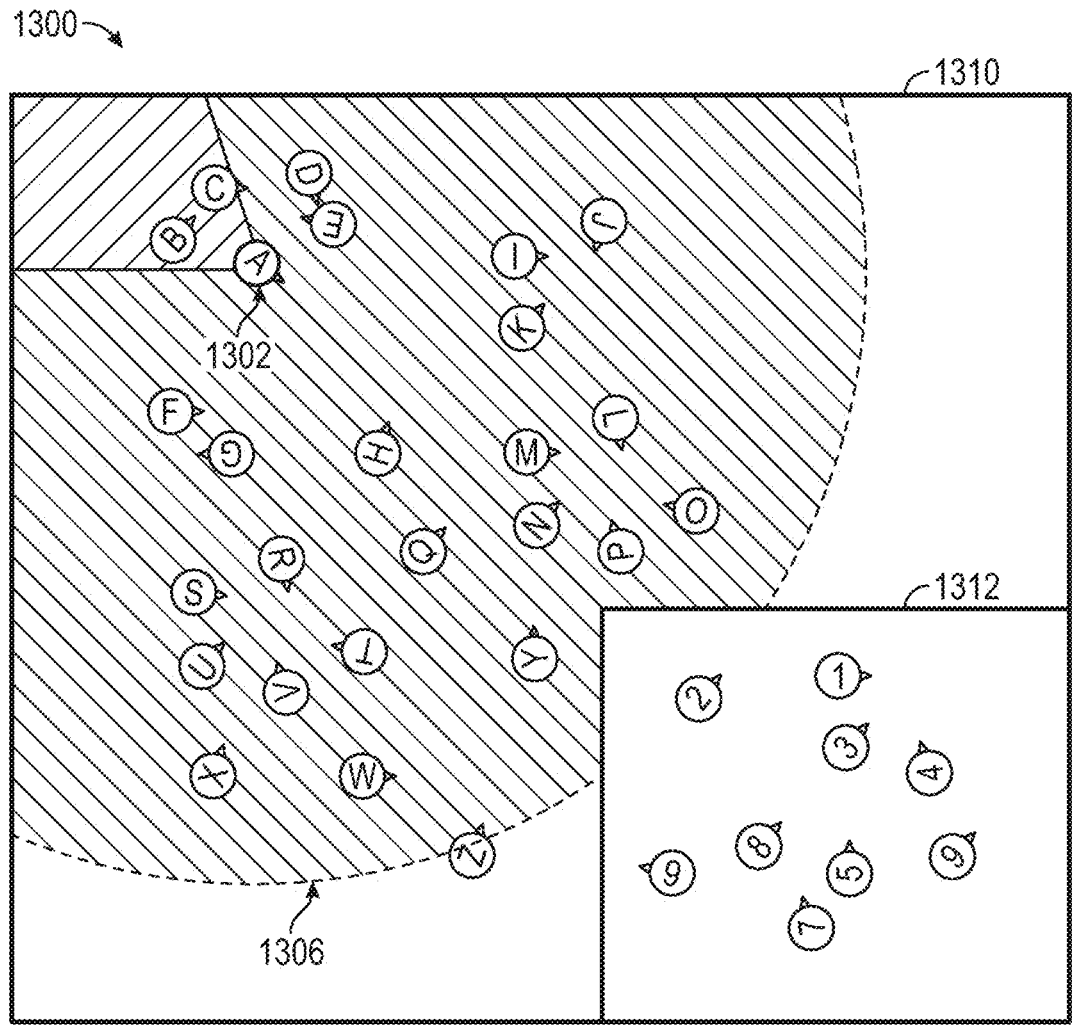
FIG. 13 illustrates an exemplary virtual reality environment, according to one or more embodiments of the disclosure.

In some examples, if the virtual reality system determines that the speaker is speaking in a raised tone and/or shouting, the virtual reality system can apply acoustic parameters corresponding to raised tones and/or shouting. FIG. 13 illustrates an exemplary virtual reality environment 1300, according to embodiments of the present disclosure. As shown in the figure, speaker 1302 is determined to be speaking in a raised tone and/or shouting. Accordingly, the virtual reality system can determine acoustic parameters corresponding to raised voice and/or shouting speech, which can establish acoustic propagation region 1306. Unlike virtual reality environment 700, where the acoustic propagation region may be increased for each participant, e.g., speaker, because the acoustic parameters are based on voice parameters, orientation parameters, gesture data, and/or an intended audience, acoustic propagation region 1306 may be larger than an acoustic propagation region of other speakers who are speaking with a normal tone. For example, listeners B-Z can hear the speech audio data corresponding to speaker 1302. In this manner, the virtual reality system can automatically adjust the acoustic parameters of a speaker's speech audio data in a natural way that mimics the real world environment, e.g., without the speaker 1302 having to manipulate cumbersome user controls.

In some embodiments, listeners located in a different virtual space from the speaker 1302 may not be within the acoustic propagation region 1306 and may be unable to hear speaker 1302. For example, as shown in the figure, listeners 1-9 located in second virtual space 1312 cannot hear speaker 1302. As discussed above, the first virtual space 1310 can be separated from the second virtual space 1312 by one or more virtual boundaries. In this manner, listener 2, who would otherwise be able to hear speaker 1302 if located in virtual space 1310, is not within the acoustic propagation region 1306. In this manner, the virtual reality system can automatically adjust the acoustic parameters of a speaker's speech audio data in a natural way that mimics the real world environment, e.g., obeys virtual boundaries established by the virtual environment.

Figure 14:
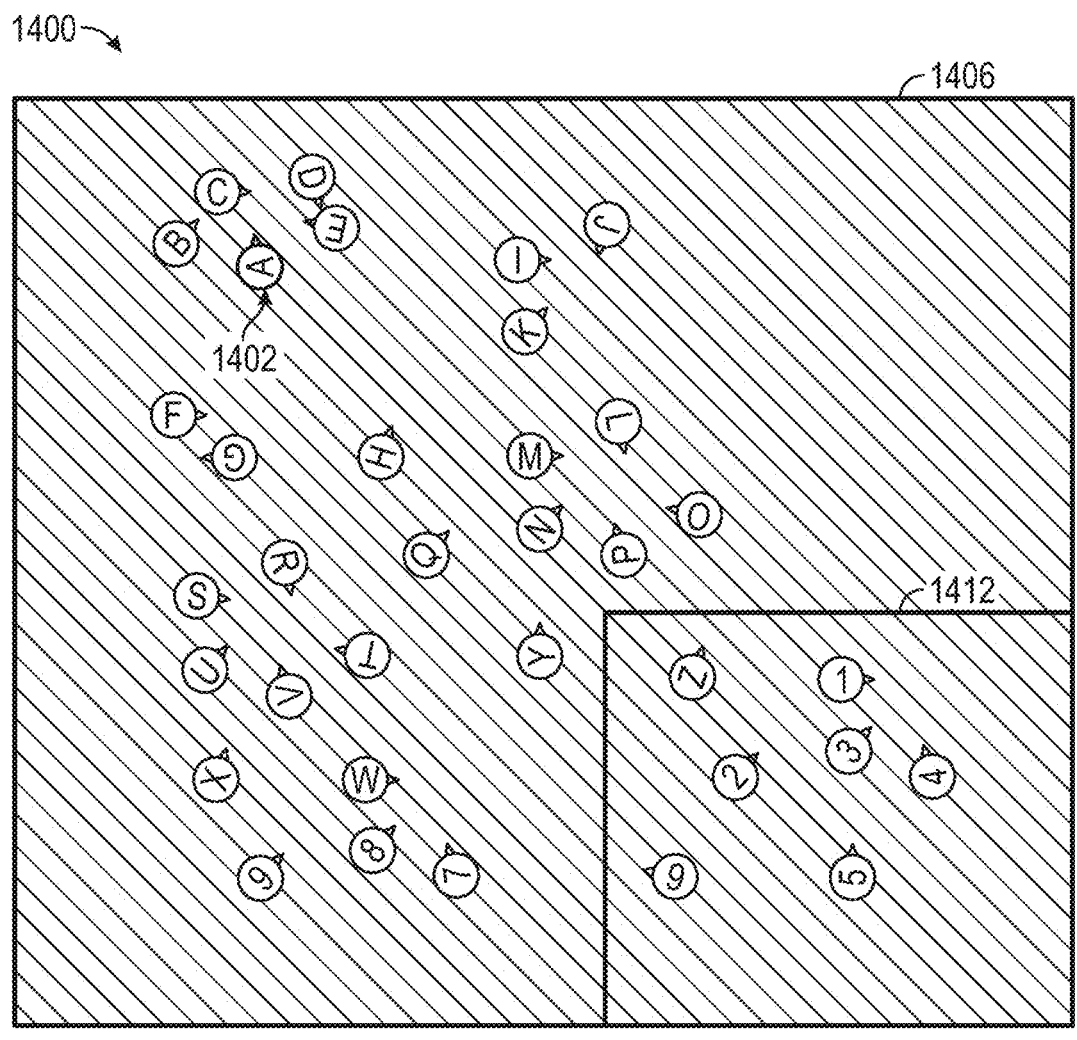
FIG. 14 illustrates an exemplary virtual reality environment, according to one or more embodiments of the disclosure.

FIG. 14 illustrates an exemplary virtual reality environment 1400, according to embodiments of the present disclosure. As shown in the figure, speaker 1402 is determined to be shouting. In some embodiments, acoustic parameters corresponding to shouting speech can route the speech audio data to all of the participants in the virtual reality environment, e.g., such that acoustic propagation region 1406 includes all participants in a virtual reality environment whether the participant is in the same virtual space as the speaker. For example, as shown in the figure all listeners in the virtual reality environment 1400, e.g., listeners B-Z and 1-9, can hear the speech audio data corresponding to speaker 1402. In this manner, the virtual reality system can automatically adjust acoustic parameters of a speech audio data of a speaker in a way that is even more convenient than the real world environment. For example, in a real world environment, a user may have to speak over a loudspeaker or intercom to ensure that listeners in another space, e.g., another room can hear the speaker. Embodiments of the present disclosure, however, permit the speaker to address all participants in the virtual reality environment at once, without having to manipulate cumbersome user controls, e.g., intercom, to ensure that listener's in a second virtual space can hear the speech.

Figures 15, 16:
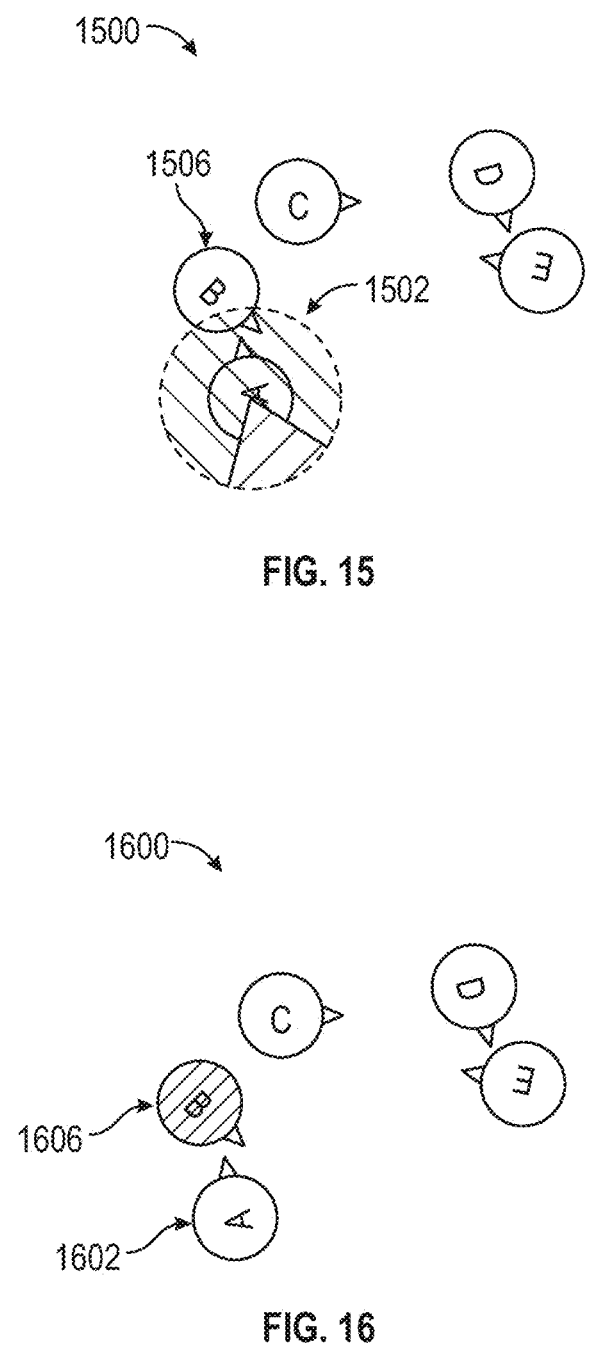

In some examples, if the virtual reality system determines that the speaker is speaking with a lowered voice and/or whispering, the virtual reality system apply acoustic parameters corresponding to a lowered voice and/or whispering. FIG. 15 illustrates an exemplary virtual reality environment 1500, according to embodiments of the present disclosure. As shown in the figure, speaker 1502 is determined to be speaking with a lowered voice and/or whispering. Accordingly, the virtual reality system can apply acoustic parameters corresponding to a lowered voice and/or whispering, which can establish acoustic propagation region 1506. As shown in the figure listener B is within the acoustic propagation region 1506 and can hear the speech audio data corresponding to speaker 1502. Listener C, who may be near listener A, e.g., within the acoustic propagation region corresponding to a normal voice, cannot hear the speech audio data corresponding to speaker 1502. Accordingly, the spatialized audio heard by listener B and listener C can differ. However, if listener C were to move closer to speaker 1502, e.g., enter the acoustic propagation region 1506, then the spatialized audio data received by listener C would include the speech audio data of speaker 1502. In this manner, the virtual reality system can automatically adjust the acoustic parameters of a speaker's speech audio data in a natural way that mimics the real world environment, e.g., without the speaker 1502a having to manipulate cumbersome user controls.

FIG. 16 illustrates an exemplary virtual reality environment 1600, according to embodiments of the present disclosure. As shown in the figure, speaker 1602 is determined to be whispering. In some embodiments, acoustic parameters corresponding to whispering speech can route the speech audio data to one or more participants in the virtual reality environment, e.g., such that acoustic propagation region 1606 includes just the one or more participants in the virtual reality environment. As shown in the figure only listener B, can hear the speech audio data corresponding to the speech of speaker 1602, e.g., the speech audio data can be routed to listener B. In some embodiments, even if another participant, e.g., listener C were to be positioned closer to speaker A than listener B, the other listener C would not be able to hear the speech of speaker A. In this manner, the virtual reality system can automatically adjust acoustic parameters of a speaker's speech audio data in a way that is even more convenient than the real world environment. For example, in a real world environment, a passerby walking past a whisper conversation may be able to overhear portions of the conversation. Embodiments of the present disclosure, however, permit the speaker to whisper and ensure that his conversation cannot be heard by other participants in the virtual reality environment without having to directly call or message a particular user.

In some embodiments, the virtual reality system can present a visual indicator to the speaker, where the visual indicator can show the speaker which participants in the virtual reality environment can hear the speaker. In some embodiments, the visual indicator can be presented to the speaker via the speaker's head wearable device. The visual indicator, for example, can visually highlight the participants that can hear the speaker. In this manner, a speaker can adjust their voice in order to target one or more participants. For example, if a user wants all participants in a virtual space to hear their speech, they can continue raising their voice until all participants in the virtual space are visually highlighted. In some embodiments, the visual indicator can appear as a halo around the participant. In some embodiments, the visual indicator can appear as an icon, e.g., ball of light, above the participant. Skilled artisans will understand that the type of visual indicator is not intended to limit the scope of this disclosure.

For example, referring to virtual reality environment 1200, speaker 1202 may receive a visual indication that shows listeners B-E can hear speaker 1202. In some embodiments, the visual indication can be presented via the speaker's wearable headset. For example, referring to virtual reality environment 1300, the speaker 1302 can raise their voice such that the acoustic parameters correspond to acoustic propagation region 1306. Speaker 1302 may receive a visual indication that listeners B-Z can hear the speaker. Referring to virtual reality environment 1400, in some embodiments, the speaker 1402 can raise their voice such that the acoustic propagation region 1406 can correspond to the entire virtual reality environment 1400. Accordingly, Speaker 1402 may receive a visual indication that listeners B-Z can hear the speaker as well as a visual indication that participants in the second virtual space 1412 can hear the speaker 1402, e.g., the walls of the second virtual space 1412 can glow.

Referring to virtual reality environment 1500, in some embodiments, the speaker 1502 may want to address particular participants. For example, the speaker 1502 can lower their voice such that the acoustic parameters correspond to acoustic propagation region 1506. Accordingly, speaker 1502 may receive a visual indication that listener B can hear the speaker 1502. Similarly, speaker 1602 may receive a visual indication that listener B can hear the speaker 1602.

FIG. 11B illustrates an exemplary flow chart of a process 1100B for modifying one or more parameters of speech audio data of a speaker's speech, according to one or more embodiments of the disclosure. For example, process 1100B can modify one or more parameters of speech audio data based on the speech audio data and the speaker's intended audience. At step 1122, a virtual reality system, e.g., virtual reality system 800, can receive audio data including speech audio data from a speaker wearing a head wearable device. In some embodiments, step 1122 can be substantially similar to step 1102 described with respect to process 1100A. At step 1124, the virtual reality system, e.g., virtual reality system 800, can identify one or more voice parameters based on the speech audio data. In some embodiments, step 1124 can be substantially similar to step 1104 described with respect to process 1100A.

At step 1126, the virtual reality system, e.g., virtual reality system 800, can determine the speaker's intended audience based on the one or more voice parameters. For example, if one or more of the voice parameters indicates that the speaker is whispering, the virtual reality system can determine that the intended audience may be a participant or listener located near the speaker. In some embodiments, if one or more of the voice parameters indicates that the speaker is shouting, the virtual reality system can determine that the intended audience may be all participants collocated in the same virtual reality space, e.g., first virtual space 510 or second virtual space 512, in the virtual reality environment. In some embodiments, step 1126 can be performed by the audience identification module 828.

At step 1128, the virtual reality system, e.g., virtual reality system 800, can determine one or more acoustic parameters based on the one or move voice parameters and the intended audience. For example, the virtual reality system can determines that the speaker is whispering and that the intended audience is a single listener. Accordingly, the virtual reality system can determine one or more acoustic parameters (e.g., decrease the distance attenuation and/or maximum distance) such that the intended listener can hear the speaker's speech, e.g., as shown in virtual reality environment 1500. In some embodiments, the virtual reality system can determine that the speaker is whispering and that the intended audience is one or more listeners and the virtual reality system can determine one or more acoustic parameters such that the intended listeners are the only listeners who can hear the speech of the speaker, e.g., as shown in virtual reality environment 1600.

In some examples, the virtual reality system can determine the speaker is shouting and that the intended audience is the entire virtual space. Accordingly, the virtual reality system can determine the acoustic parameter (e.g., increase the distance attenuation and/or maximum distance) such that every participant in the same virtual space as the speaker can hear the speaker's speech, e.g., as shown in virtual reality environment 1300. In some embodiments, the virtual reality system can determine that the speaker is shouting and that the intended audience is the entire virtual reality environment. Accordingly, the virtual reality system can determine one or more acoustic parameters such that the all participants in the virtual reality environment can hear the speech of the speaker, e.g., as shown in virtual reality environment 1400.

In some embodiments, step 1128 can be performed by acoustic parameter module 824. In some embodiments, the speaker's wearable head device 802 can determine the one or more acoustic parameters. In some embodiments, the server 804 can determine one or more acoustic parameters.

At step 1130, the virtual reality system, e.g., virtual reality system 800, can apply the determined acoustic parameters to the audio data corresponding to the speaker's speech to provide spatialized audio. In some embodiments step 1130 can be substantially similar to step 1108 described with respect to process 1100A. In some embodiments, the system can modify the acoustic parameters to route the speech audio data directly to one or more listeners. For example, if a speaker, e.g., speaker 1002B, is whispering to a listener, e.g., listener 1006B, the virtual reality system can determine the acoustic parameters, such that speech audio data is routed to listener 1006B such that only listener 1006B can hear the speaker 1002B. In one or more examples, speech audio data can be routed directly to one or more listeners without applying other modified acoustic parameters, e.g., changes in a distance attenuation, a frequency dependent distance attenuation, a rolloff curve type, an environment model, an environment send level, a radiation based parameter, a frequency dependent radiation gain, and a maximum distance. For example, if the intended audience is the entire room, then the speech audio data can be routed directly to all participants in the room without modifying other acoustic parameters. As another example, if the intended audience is a single participant, the speech audio data can be routed directly to the intended participant without modifying other acoustic parameters. In some embodiments, the spatialized audio can be output via one or more speakers of the listener's wearable head device 106a-106n. In some embodiments, the spatialized audio may differ between each of the listener's wearable head device 106a-106n.

FIG. 11C illustrates an exemplary flow chart of a process 1100C for modifying one or more parameters of speech audio data of a speaker's speech, according to one or more embodiments of the disclosure. For example, process 1100C can modify one or more parameters of speech audio data based on the voice parameters, orientation parameters, and/or gesture data. At step 1132, a virtual reality system, e.g., virtual reality system 800, can receive speech audio data including speech audio data from a speaker wearing a head wearable device. In some embodiments, step 1132 can be substantially similar to step 1102 described with respect to process 1100A. At step 1134, the virtual reality system, e.g., virtual reality system 800, can identify one or more voice parameters based on the speech audio data. In some embodiments, step 1134 can be substantially similar to step 1104 described with respect to process 1100A.

At step 1136 the virtual reality system, e.g., virtual reality system 800, can obtain orientation parameters and/or gesture data detected by one or more sensors. In some embodiments, step 1136 can be performed by orientation tracking module 830. In some examples, orientation parameters can be obtained by processing orientation data detected by one or more tracking components 814, e.g., inertial measurement unit (IMU). The orientation parameters can be indicative of an orientation of a speaker's wearable head device, an orientation of a speaker with respect to one or more participants, and a proximity of the speaker to one or more participants.

In some examples, gesture data can be obtained by processing one or more image data detected by one or more image sensors 816. In some embodiments, step 1136 can be performed by gesture recognition module 832. In some embodiments, gesture data can indicate gestures including, but not limited to, hand gestures (e.g., raising a hand or putting an index finger or hand to their mouth), body language (e.g., leaning in or away), body orientation (e.g., facing toward or away), eye gaze direction, and interaction with objects in the real or virtual environment (e.g., clinking a wine glass, banging a gavel).

At step 1138, the virtual reality system, e.g., virtual reality system 800, can determine one or more acoustic parameters based on the one or move voice parameters, orientation parameters and/or gesture data. In some embodiments, step 1138 can be performed by acoustic parameter module 824. In some embodiments, the one or more acoustic parameters may be based on inferences drawn from a combination of the one or move voice parameters, orientation parameters and/or gesture data. In some examples, the virtual reality system can determine that the speaker is whispering, e.g., the speaker is has a lowered voice, the speaker is turned toward a particular listener, and/or gazing toward the particular listener. Accordingly, the virtual reality system can determine one or more acoustic parameters (e.g., decrease distance attenuation and/or maximum distance) such that the particular listener may be the only participant who can hear the speaker's speech, e.g., as shown in virtual reality environment 1500. In some embodiments, the virtual reality system can determine that the speaker is whispering, e.g., the speaker is has a lowered voice, the speaker is turned toward one or more intended listeners, and/or gazing toward the one or more intended listeners. Accordingly, the virtual reality system can determine one or more acoustic parameters such that the intended listeners are the only listeners who can hear the speech of the speaker, e.g., as shown in virtual reality environment 1600.

In some examples, the virtual reality system can determine that the speaker is shouting, e.g., the speaker is has a raised voice, the speaker's head is tilted upward, and/or the speaker's hands are cupped to their mouth. Accordingly, the virtual reality system can determine one or more acoustic parameters (e.g., increase distance attenuation and/or maximum distance) such that such that every participant in the same virtual space as the speaker can hear the speaker's speech, e.g., as shown in virtual reality environment 1300. In some embodiments, the virtual reality system can determine that the speaker is shouting, e.g., the speaker is has a raised voice, and that the speaker's head is tilted upward and/or the speaker's hands are cupped to their mouth. Accordingly the virtual reality system can determine one or more acoustic parameters such that the all participants in the virtual reality environment can hear the speech of the speaker, e.g., as shown in virtual reality environment 1400.

At step 1140, the virtual reality system, e.g., virtual reality system 800, can apply the determined acoustic parameters to the audio data corresponding to the speaker's speech to provide spatialized audio. In some embodiments step 1140 can be substantially similar to step 1108 described with respect to process 1100A and/or step 1130 described with respect to process 1100B. In some embodiments, step 1140 can be performed by voice processing module 826. In some embodiments, the spatialized audio can be output via one or more speakers of the listener's wearable head device 106a-106n.

FIG. 11D illustrates an exemplary flow chart of a process 1100D for modifying one or more parameters of audio of a speaker's speech, according to one or more embodiments of the disclosure. For example, process 1100D can modify one or more parameters of speech audio data based on the speech audio data, an intended audience, orientation data, and/or gesture data. At step 1142, a virtual reality system, e.g., virtual reality system 800, can receive audio data including speech audio data from a speaker wearing a head wearable device. In some embodiments, step 1142 can be substantially similar to step 1102 described with respect to process 1100A. At step 1144, the virtual reality system, e.g., virtual reality system 800, can identify one or more voice parameters based on the speech audio data. In some embodiments, step 1144 can be substantially similar to step 1104 described with respect to process 1100A. At step 1146, the virtual reality system, e.g., virtual reality system 800, can obtain orientation parameters and/or gesture data detected by one or more sensors. In some embodiments, step 1146 can be substantially similar to step 1136 described with respect to process 1100C.

At step 1148, the virtual reality system, e.g., virtual reality system 800, can determine the speaker's intended audience based on the one or more voice parameters, orientation parameters, and/or gesture data. For example, one or more of the voice parameters, orientation parameters, and gesture data can indicate that the speaker is whispering, e.g., the speaker is speaking with a lowered voice, the speaker is turned toward a particular listener and/or gazing toward the particular listener. Accordingly, the virtual reality system can determine that the particular listener may be the intended audience. In some examples, one or more of the voice parameters orientation parameters, and gesture data can indicate that the speaker is shouting, e.g., the speaker is speaking with a raised voice, the speaker's head is tilted upward and/or the speaker's hands are cupped to their mouth. Accordingly, the virtual reality system can determine that the intended audience may correspond to every participant in the same virtual space as the speaker.

At step 1150, the virtual reality system, e.g., virtual reality system 800, can determine one or more acoustic parameters based on the voice parameters, intended audience, orientation parameters, and/or gesture data. In some embodiments, the one or more acoustic parameters may be based on inferences drawn from a combination of the one or more voice parameters, intended audience, orientation parameters and/or gesture data. For example, the virtual reality system can determine that the speaker is whispering, e.g., the speaker is speaking with a lowered voice, the speaker is turned toward a particular listener, gazing toward the particular listener, and/or that the particular listener is the intended audience. Accordingly, the virtual reality system can determine one or more acoustic parameters (e.g., decrease distance attenuation and/or maximum distance) such that the particular listener may be the only participant who can hear the speaker's speech, e.g., as shown in virtual reality environment 1500. In some embodiments, the virtual reality system can determine that the speaker is whispering, e.g., the speaker is speaking with a lowered voice, the speaker is turned toward a particular listener, gazing toward the particular listener, and/or that the particular listener is the intended audience. Accordingly, the virtual reality system can determine one or more acoustic parameters such that the intended listeners are the only listeners who can hear the speech of the speaker, e.g., as shown in virtual reality environment 1600. In some embodiments, this can include directly routing the speech audio data to the one or more intended listeners.

In some examples, the virtual reality system can determine that the speaker is shouting, e.g., the speaker is speaking with a raised voice, the speaker's head is tilted upward, the speaker's hands are cupped to their mouth, and/or the intended audience corresponds to an entire virtual space, e.g., space 1310 or 1312. Accordingly, the virtual reality system can determine one or more acoustic parameters (e.g., increase distance attenuation and/or maximum distance) such that such that every participant in the same virtual space as the speaker can hear the speaker's speech, e.g., as shown in virtual reality environment 1300. In some embodiments, the virtual reality system can determine that the speaker is shouting, e.g., the speaker is speaking with a raised voice, the speaker's head is tilted upward, the speaker's hands are cupped to their mouth, and/or the intended audience corresponds to an entire virtual reality environment, e.g., virtual reality environment 1400. Accordingly, the virtual reality system can determine one or more acoustic parameters such that the all participants in the virtual reality environment can hear the speech of the speaker, e.g., as shown in virtual reality environment 1400.

At step 1152, the virtual reality system, e.g., virtual reality system 800, can apply the determined acoustic parameters to the speech audio data corresponding to the speaker's speech to provide spatialized audio. In some embodiments step 1152 can be substantially similar to step 1108 described with respect to process 1100A and or step 1130 described with respect to process 1100B. In some embodiments, the spatialized audio can be output via one or more speakers of the listener's wearable head device 106a-106n.

Figure 11E:
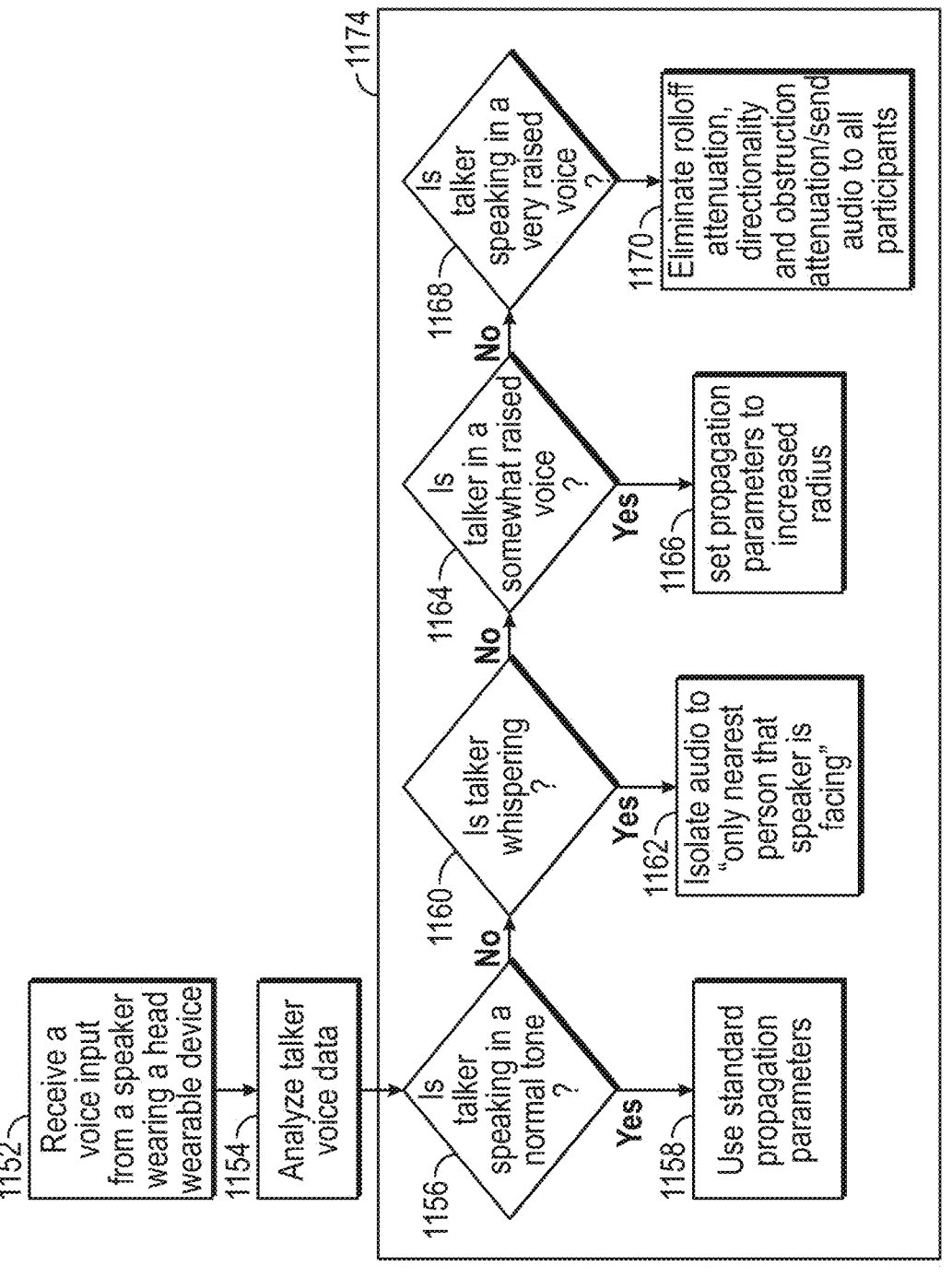

FIG. 11E illustrates an exemplary flow chart of a process 1100E for modifying one or more parameters of audio of a speaker's speech, according to one or more embodiments of the disclosure. At step 1152, a virtual reality system, e.g., virtual reality system 800, can receive audio data including speech audio data from a speaker wearing a head wearable device. In some embodiments, step 1152 can be substantially similar to step 1102 described with respect to process 1100A. At step 1154, the virtual reality system, e.g., virtual reality system 800, can identify one or more voice parameters based on the speech audio data. In some embodiments, step 1154 can be substantially similar to step 1104 described with respect to process 1100A. A skilled artisan will understand that processes 1100A-1100E are merely exemplary and other processes can be implemented without departing from the scope of the present disclosure.

At block 1174, the virtual reality system can determine one or more acoustic parameters based on the voice parameters. In some embodiments, block 1174 can determine one or more acoustic parameters based on voice parameters, an intended audience, orientation parameters, and/or gesture data. For example, at step 1156, the system can determine whether the speaker is speaking in a normal tone. If the system determines that the speaker is speaking in a normal tone, the system can use one or more standard acoustic parameters at step 1158, e.g., as shown in virtual reality environment 1200. If the system determines that the speaker is not speaking in a normal tone, the system can determine whether the speaker is whispering at step 1160. If the system determines that the speaker is speaking in a whisper, the system can isolate audio to the participant closest to the speaker at step 1162, e.g., as shown in virtual reality environment 1500. If the system determines that the speaker is not whispering, the system can determine whether the speaker is using a somewhat raised voice at step 1164. If the system determines that the speaker is using a somewhat raised voice, the system can set acoustic parameters to correspond to a larger acoustic propagation region, e.g., by increasing a radius of the acoustic propagation region, at step 1166. If the system determines that the speaker is not using a somewhat raised voice, the system can determine whether the speaker is using a very raised voice, e.g., shouting, at step 1168. If the system determines that the speaker is using a very raised voice, the system can send the speech audio data to all participants and/or eliminate one or more acoustic parameters, e.g., rolloff attenuation, directionality, and/or obstruction attenuation, at step 1170.

Example Virtual Reality Environments

Accordingly, embodiments according to embodiments of this disclosure can facilitate natural social interactions that mimic a real world environment in a virtual reality or mixed reality environment among multiple participants. As discussed above, embodiments of the present disclosure can determine and modify one or more acoustic parameters based on attributes of a speaker's voice. Embodiments according to this disclosure provide methods and systems that can analyze the voice of a speaker and, optionally, combine additional information such as speaker and/or listener orientation, proximity, hand, body, and/or head gestures, and/or intended audience to determine and apply one or more speech acoustic parameters in a flexible manner, e.g., without clumsy user interfaces or unintuitive controls.

In one or more examples, a virtual reality environment can correspond to a brainstorming session. For example, in a virtual reality environment, e.g., virtual reality environment 600, a virtual brainstorming session can include multiple sub-groups. Because participants are brainstorming in small groups, the speakers, e.g., speakers 602a, 602g, 602j, 602n, 602u, 602z, and 602-8 may be speaking in a normal tone. Accordingly, the acoustic parameters can be determined as corresponding to normal speech and establish acoustic propagation regions 606a, 606g, 606j, 606n, 606u, 606z, and 606-8. In some examples, nearby participants that are not within the acoustic propagation region may be able to listen-in on the speech based on one or more acoustic parameters. In some examples, participants located across the virtual space may be unable to hear the speaker due to one or more acoustic parameters.

In some examples, a speaker in one of the subgroups in the brainstorming session can lean over, cup their hands to their mouth, and whisper to a colleague. In a real world environment, such a whisper may not be heard by other members of the sub-group. Similarly, according to one or more embodiments of this disclosure, the virtual reality system, e.g., audio analyzer 820 of the virtual reality system 800, can determine via the audio analysis module 822 that the user is whispering, determine via the orientation tracking module 830 that the speaker is facing the colleague, determine via the gesture recognition 832 module that the speaker is leaning toward the colleague, and determine via the audience identification module 828 that the intended audience is the colleague. In some embodiments according to this example, the audio analyzer 820 can apply one or more acoustic parameters corresponding to virtual reality environment 1500, where the acoustic parameters can be adjusted to have a small acoustic propagation region 1506, e.g., compared to acoustic propagation region 606a. In some embodiments according to this example, the audio analyzer can apply one or more acoustic parameters corresponding to virtual reality environment 1600, where the acoustic parameters can be adjusted to route the speech audio data corresponding to the speech of speaker 1602 to listener B.

In some examples, speaker 1302 can be the designated leader of the brainstorming session. In some examples, speaker 1302 may desire to let each of the sub-groups know that they have five minutes to wrap up their brainstorming and should prepare to present their findings to the entire group. In a real world environment, the speaker could simply raise their voice and/or shout to the group to relay this message. Similarly, according to examples of this disclosure, the speaker 1302 can raise their voice and/or exhibit behavior that indicates that they would like to address the entire virtual space, e.g., tilt their head up, wave their hands, gaze at multiple participants as they speak. Accordingly, the virtual reality system, e.g., audio analyzer 820 of the virtual reality system 800, can determine one or more acoustic parameters based on the determined one or more voice parameters, orientation parameters, gesture data, and/or intended audience, as described above. In some embodiments according to this example, the audio analyzer can apply one or more acoustic parameters corresponding to virtual reality environment 1200, where the acoustic parameters can be adjusted to have a large acoustic propagation region 1306, e.g., compared to acoustic propagation region 606a. In some embodiments according to this example, the audio analyzer can apply one or more acoustic parameters corresponding to virtual reality environment 1400, where the acoustic parameters can be adjusted to route the speech audio data corresponding to the speech of speaker 1402 to all participants in the virtual reality environment 1400.

A participant in a virtual reality environment according to examples of this disclosure may overhear their name spoken by a speaker in another sub-group. In a real world environment, a listener can easily focus their attention on a conversation when they hear a keyword such as their name. Similarly, according to one or more embodiments of this disclosure, the acoustic parameters of the speech audio data corresponding to the speaker who spoke the participant's name can be modified such that the participant can focus on the speech of the speaker, e.g., even if the participant is not within the acoustic propagation region of the speaker.

In one or more examples, a virtual reality environment can correspond to a virtual event reception session. A participant may start clinking a glass (real or virtual) with a knife (real or virtual). According to one or more embodiments of this disclosure, the gesture of clinking a knife against a glass can be recognized and heard by all participants in the virtual reality environment. Moreover, when the participant speaks, her speech can be heard all participants in the virtual reality environment.

In one or more examples, a participant can look at a colleague with an index finger pressed against their own lips. According to one or more embodiments of this disclosure, only the colleague can hear the speech of the participant. In some embodiments, the participant may be whispering. In other embodiments, the participant may be speaking in a normal tone.

In one or more examples, a participant can recognize an old friend across the room of a virtual reality space. The participant can shout the name of the old friend. According to one or more embodiments of this disclosure, everyone in the virtual reality space, including the old friend can hear the participant shout the old friend's name.

In some examples, two or more participants may be speaking to each other with raised voices, e.g., the participants are shouting at each other. In a real world environment, participants of other conversations near the vicinity of these shouting participants can hear this shouting conversation, which can interfere with the other conversations. According to one or more embodiments of this example, a virtual reality system according to embodiments of this disclosure can determine that these shouting participants are shouting at each other and modify the speech acoustic parameters to exclude the speech audio data of the shouting participants from the nearby participants of other conversations.

Embodiments of the present disclosure can provide systems and methods for presenting audio signals based on an analysis of a voice of a speaker in an augmented reality or mixed reality environment. Methods according to embodiments of this disclosure can include receiving audio data from a microphone of a first wearable head device, the first wearable head device in communication with a virtual environment, the audio data comprising speech data. In some examples, the methods can further include identifying a voice parameter based on the audio data. In some examples, the methods can further include determining an acoustic parameter based on the voice parameter. In some examples, the methods can further include applying the acoustic parameter to the audio data to generate a spatialized audio signal. In some examples, the methods can further include presenting the spatialized audio signal to a second wearable head device in communication with the virtual environment.

In some embodiments, determining the acoustic parameter can include determining one or more of a distance attenuation, a frequency dependent distance attenuation, a rolloff curve type, an environment model, an environment send level, a radiation based parameter, a frequency dependent radiation gain, and a maximum distance. In some embodiments, the voice parameter can indicate at least one of a normal tone, a lowered tone, a raised tone, a whisper, and a shout. In some embodiments, applying the acoustic parameter includes routing the audio data to one or more participants of the virtual environment.

In some embodiments, the method can further include receiving, from one or more tracking components of the first wearable head device, orientation data corresponding an orientation of the first head wearable device. In some embodiments, the method can further include determining one or more orientation parameters based on the orientation data. In some embodiments, determining the acoustic parameter is further based on the orientation data.

In some embodiments, the method can further include receiving from one or more image sensors of the first wearable head device, image data indicative of a gesture performed by a user of the first wearable head device. In some embodiments, the method can further include determining gesture data based on the image data. In some embodiments, the gesture can include at least one selected from a hand gesture, a body language gesture, a body orientation, an eye gaze direction, and an interaction with an object in the environment. In some embodiments, determining the acoustic parameter is further based on the gesture data.

In some embodiments, the method can further include determining an intended audience based on the one or more audio parameters, wherein the second wearable head device corresponds to a member of the intended audience. In some embodiments, the method can further include presenting a visual indicator to a user of the first wearable head device, wherein the visual indicator shows one or more participants who can hear the spatialized output.

Methods according to embodiments of this disclosure can include receiving, at a second wearable head device, spatialized audio data generated via a first wearable head device, the first wearable head device in communication with a virtual environment and the second wearable head device in communication with the virtual environment. In some examples, generating the spatialized audio data via the first wearable head device can include: receiving, at the first wearable head device, audio data from a microphone of the first wearable head device, the audio data comprising speech data, identifying a voice parameter based on the audio data, determining an acoustic parameter based on the voice parameter, and applying the acoustic parameter to the audio data to generate a spatialized audio signal.

In some embodiments, determining the acoustic parameter comprises determining one or more of a distance attenuation, a frequency dependent distance attenuation, a rolloff curve type, an environment model, an environment send level, a radiation based parameter, a frequency dependent radiation gain, and a maximum distance. In some embodiments, the voice parameter indicates at least one of a normal tone, a lowered tone, a raised tone, a whisper, and a shout. In some embodiments, applying the acoustic parameter includes routing the audio data to one or more participants of the virtual environment.

In some embodiments, generating the spatialized audio data further comprises receiving, from one or more tracking components of the first wearable head device, orientation data corresponding to an orientation of the first head wearable device. In some embodiments, generating the spatialized audio data further comprises determining one or more orientation parameters based on the orientation data. In some embodiments, determining the acoustic parameter is further based on the orientation data.

In some embodiments, generating the spatialized audio data further comprises receiving, from one or more image sensors of the first wearable head device, image data indicative of a gesture performed by a user of the first wearable head device. In some embodiments, generating the spatialized audio data further comprises determining gesture data based on the image data. In some embodiments, determining the acoustic parameter is further based on the gesture data. In some embodiments, the gesture comprises at least one of a hand gesture, a body language gesture, a body orientation, an eye gaze direction, and an interaction with an object in the environment.

In some embodiments, generating the spatialized audio data further comprises determining an intended audience based on the one or more audio parameters, and wherein the second wearable head device corresponds to a member of the intended audience.

Systems according to embodiments of this disclosure can include, at least, one or more processors, a memory, and one or more programs. In some examples, the one or more programs can be stored in the memory and be configured to be executed by the one or more processors. In some examples, the one or more programs include instructions for: receiving audio data from a microphone of a first wearable head device, the first wearable head device in communication with a virtual environment, the audio data comprising speech data, identifying a voice parameter based on the audio data, determining an acoustic parameter based on the voice parameter, applying the acoustic parameter to the audio data to generate a spatialized audio signal, and presenting the spatialized audio signal to a second wearable head device in communication with the virtual environment.

Systems according to embodiments of this disclosure can include, at least, one or more processors, a memory, and one or more programs. In some examples, the one or more programs can be stored in the memory and be configured to be executed by the one or more processors. In some examples, the one or more programs include instructions for receiving, at a second wearable head device, spatialized audio data generated via a first wearable head device, the first wearable head device in communication with a virtual environment and the second wearable head device in communication with the virtual environment. In some examples, generating the spatialized audio data via the first wearable head device can include: receiving, at the first wearable head device, audio data from a microphone of the first wearable head device, the audio data comprising speech data, identifying a voice parameter based on the audio data, determining an acoustic parameter based on the voice parameter, and applying the acoustic parameter to the audio data to generate a spatialized audio signal.

Although the disclosed examples have been fully described with reference to the accompanying drawings, it is to be noted that various changes and modifications will become apparent to those skilled in the art. For example, elements and/or components illustrated in the drawings may be not be to scale and/or may be emphasized for explanatory purposes. As another example, elements of one or more implementations may be combined, deleted, modified, or supplemented to form further implementations. Other combinations and modifications are to be understood as being included within the scope of the disclosed examples as defined by the appended claims.

The invention claimed is:

1. A method comprising:
receiving audio data from a microphone of a first wearable head device, the first wearable head device in communication with a virtual environment, the audio data comprising speech data;
identifying a voice parameter based on the audio data;
determining an acoustic parameter based on the voice parameter, wherein the determining the acoustic parameter comprises determining one or more of a distance attenuation, a frequency dependent distance attenuation, a rolloff curve type, an environment model, an environment send level, a radiation based parameter, a frequency dependent radiation gain, and a maximum distance, and wherein the voice parameter indicates at least one of a normal tone, a lowered tone, a raised tone, a whisper, and a shout;
receiving from one or more image sensors of the first wearable head device, image data indicative of a gesture performed by a user of the first wearable head device;
determining gesture data based on the image data, wherein the gesture comprises at least one selected from a hand gesture, a body language gesture, and an interaction with an object in the environment, and wherein determining the acoustic parameter is further based on the gesture data;
determining an intended audience based on the acoustic parameter, wherein a second wearable head device corresponds to a member of the intended audience;
applying the acoustic parameter to the audio data to generate a spatialized audio signal, and
presenting the spatialized audio signal to the second wearable head device in communication with the virtual environment.

2. The method of claim 1, wherein the applying the acoustic parameter includes routing the audio data to one or more participants of the virtual environment.

3. The method of claim 1, further comprising receiving, from one or more tracking components of the first wearable head device, orientation data corresponding to an orientation of the first head wearable device.

4. The method of claim 3, further comprising determining one or more orientation parameters based on the orientation data.

5. The method of claim 3, wherein the determining the acoustic parameter is further based on the orientation data.

6. The method of claim 1, further comprising presenting a visual indicator to a user of the first wearable head device, wherein the visual indicator shows one or more participants who can hear the spatialized audio signal.

7. The method of claim 1, wherein the determining the acoustic parameter comprises determining one or more of a frequency dependent distance attenuation, a rolloff curve type, an environment model, an environment send level, a radiation based parameter, and a frequency dependent radiation gain.

8. The method of claim 1, wherein the voice parameter indicates a whisper.

9. The method of claim 1, wherein the voice parameter indicates a raised tone.

10. The method of claim 1, wherein the gesture data includes a hand gesture.

11. The method of claim 1, wherein the gesture data includes an interaction with the object in the environment.

12. A method comprising:

receiving, at a second wearable head device, spatialized audio data generated via a first wearable head device, the first wearable head device in communication with a virtual environment and the second wearable head device in communication with the virtual environment;

wherein the generating the spatialized audio data via the first wearable head device comprises;

receiving, at the first wearable head device, audio data from a microphone of the first wearable head device, the audio data comprising speech data;

identifying a voice parameter based on the audio data;

determining an acoustic parameter based on the voice parameter, wherein the determining the acoustic parameter comprises determining one or more of a distance attenuation, a frequency dependent distance attenuation, a rolloff curve type, an environment model, an environment send level, a radiation based parameter, a frequency dependent radiation gain, and a maximum distance, and wherein the voice parameter indicates at least one of a normal tone, a lowered tone, a raised tone, a whisper, and a shout;

receiving from one or more image sensors of the first wearable head device, image data indicative of a gesture performed by a user of the first wearable head device;

determining gesture data based on the image data, wherein the gesture comprises at least one selected from a hand gesture, a body language gesture, and an interaction with an object in the environment, and wherein determining the acoustic parameter is further based on the gesture data;

determining an intended audience based on the acoustic parameter, wherein a second wearable head device corresponds to a member of the intended audience; and applying the acoustic parameter to the audio data to generate a spatialized audio signal.

13. The method of claim 12, wherein the applying the acoustic parameter includes routing the audio data to one or more participants of the virtual environment.

14. The method of claim 12, wherein the generating the spatialized audio data further comprises receiving, from one or more tracking components of the first wearable head device, orientation data corresponding to an orientation of the first head wearable device.

15. The method of claim 14, wherein the generating the spatialized audio data further comprises determining one or more orientation parameters based on the orientation data.

16. The method of claim 14, wherein the determining the acoustic parameter is further based on the orientation data.

17. The method of any of claim 12, wherein the generating the spatialized audio data further comprises determining an intended audience based on the voice parameter, and wherein the second wearable head device corresponds to a member of the intended audience.

18. A system comprising:

a memory; and one or more processors configured to perform a method comprising:

receiving audio data from a microphone of a first wearable head device, the first wearable head device in communication with a virtual environment, the audio data comprising speech data;

identifying a voice parameter based on the audio data;

determining an acoustic parameter based on the voice parameter, wherein the determining the acoustic parameter comprises determining one or more of a distance attenuation, a frequency dependent distance attenuation, a rolloff curve type, an environment model, an environment send level, a radiation based parameter, a frequency dependent radiation gain, and a maximum distance, and wherein the voice parameter indicates at least one of a normal tone, a lowered tone, a raised tone, a whisper, and a shout;

receiving from one or more image sensors of the first wearable head device, image data indicative of a gesture performed by a user of the first wearable head device;

determining gesture data based on the image data, wherein the gesture comprises at least one selected from a hand gesture, a body language gesture, and an interaction with an object in the environment, and wherein determining the acoustic parameter is further based on the gesture data;

determining an intended audience based on the acoustic parameter, wherein a second wearable head device corresponds to a member of the intended audience;

applying the acoustic parameter to the audio data to generate a spatialized audio signal, and presenting the spatialized audio signal to the second wearable head device in communication with the virtual environment.

19. A system comprising:

a memory; and one or more processors configured to perform a method comprising:

receiving, at a second wearable head device, spatialized audio data generated via a first wearable head device, the first wearable head device in communication with a virtual environment and the second wearable head device in communication with the virtual environment;

wherein the generating the spatialized audio data via the first wearable head device comprises:

receiving, at the first wearable head device, audio data from a microphone of the first wearable head device, the audio data comprising speech data;

identifying a voice parameter based on the audio data;

determining an acoustic parameter based on the voice parameter, wherein the determining the acoustic parameter comprises determining one or more of a distance attenuation, a frequency dependent distance attenuation, a rolloff curve type, an environment model, an environment send level, a radiation based parameter, a frequency dependent radiation gain, and a maximum distance, and wherein the voice parameter indicates at least one of a normal tone, a lowered tone, a raised tone, a whisper, and a shout;

receiving from one or more image sensors of the first wearable head device, image data indicative of a gesture performed by a user of the first wearable head device;

determining gesture data based on the image data, wherein the gesture comprises at least one selected from a hand gesture, a body language gesture, and an interaction with an object in the environment, and wherein determining the acoustic parameter is further based on the gesture data;

determining an intended audience based on the acoustic parameter, wherein a second wearable head device corresponds to a member of the intended audience; and applying the acoustic parameter to the audio data to generate a spatialized audio signal.

* * * * *